US011481904B1

(12) United States Patent
Holkesvik et al.

(10) Patent No.: US 11,481,904 B1
(45) Date of Patent: Oct. 25, 2022

(54) AUTOMATED DETERMINATION OF TREE INVENTORIES IN ECOLOGICAL REGIONS USING PROBABILISTIC ANALYSIS OF OVERHEAD IMAGES

(71) Applicant: Natural Capital Exchange, Inc., San Francisco, CA (US)

(72) Inventors: Michael Holkesvik, New Haven, CT (US); Max Joseph, Denver, CO (US); Henry Rodman, Duluth, MN (US); Nathan Rutenbeck, Brooklin, ME (US); Zachary Smith, New Lebanon, OH (US)

(73) Assignee: Natural Capital Exchange, Inc., San Francisco, CA (US)

( * ) Notice: Subject to any disclaimer, the term of this patent is extended or adjusted under 35 U.S.C. 154(b) by 0 days.

(21) Appl. No.: 17/568,160

(22) Filed: Jan. 4, 2022

(51) Int. Cl.
*G06T 7/00* (2017.01)
*G06T 7/11* (2017.01)

(52) U.S. Cl.
CPC .............. *G06T 7/11* (2017.01); *G06T 7/0002* (2013.01); *G06T 2207/10036* (2013.01); *G06T 2207/30188* (2013.01)

(58) Field of Classification Search
CPC ..................... G06T 7/0002; G06T 7/11; G06T 2207/10036; G06T 2207/30188
See application file for complete search history.

(56) References Cited

U.S. PATENT DOCUMENTS 9,453,795 B1 * 9/2016 Loew ..................... G01N 21/55
10,467,475 B2 11/2019 Parisa
(Continued)

FOREIGN PATENT DOCUMENTS

CN 102349420 A 2/2012
CN 102305792 B 3/2014
(Continued)

OTHER PUBLICATIONS

Wang et al. ("New logic for large-scale land cover classification based on remote sensing," 17th International Conference on Geoinformatics; Date of Conference: Aug. 12-14, 2009) (Year: 2009).*

(Continued)

*Primary Examiner* — Yubin Hung
(74) *Attorney, Agent, or Firm* — VLP Law Group LLP; James A. D. White

(57) ABSTRACT

Techniques are described for automated operations to determine tree inventory information for an area of land using visual data of overhead image(s), such as by using a trained prediction model specific to an ecological region to which the land area belongs as part of probabilistically determining multiple types of information about trees in that land area, and for subsequently using the determined tree inventory information in one or more manners (e.g., to improve management of trees in that land area). The images may, for example, include spectral satellite images that include at least visible light data for an area of land, and the determined tree inventory information may include information about the trees present on the land area, such as, for example, predictions of particular tree species, quantities of each of the tree species, sizes of the trees, etc.

22 Claims, 15 Drawing Sheets

(11 of 15 Drawing Sheet(s) Filed in Color)

(56) References Cited

U.S. PATENT DOCUMENTS

| | | | |
|---|---|---|---|
| 2004/0078232 A1* | 4/2004 | Troiani | G16H 50/20 |
| | | | 705/2 |
| 2005/0105576 A1* | 5/2005 | Kim | H01S 5/18308 |
| | | | 372/50.1 |
| 2008/0015711 A1* | 1/2008 | Charland | A01G 23/00 |
| | | | 700/1 |
| 2010/0023376 A1 | 1/2010 | Brown | |
| 2013/0211721 A1* | 8/2013 | Parisa | G06K 9/6293 |
| | | | 702/2 |
| 2014/0164070 A1 | 6/2014 | Smith | |
| 2015/0189166 A1* | 7/2015 | San Pedro Wandelmer | |
| | | | H04N 5/23293 |
| | | | 348/333.11 |
| 2018/0173820 A1* | 6/2018 | Dow | G16B 50/30 |
| 2019/0107521 A1* | 4/2019 | Riley | G01K 3/14 |
| 2020/0272625 A1* | 8/2020 | Brumby | G06F 16/2465 |
| 2021/0004001 A1* | 1/2021 | Kaneda | H04N 7/18 |
| 2021/0011550 A1* | 1/2021 | Barkman | G06F 17/18 |
| 2021/0256176 A1* | 8/2021 | Penrose | G06F 30/13 |

FOREIGN PATENT DOCUMENTS

| | | | |
|---|---|---|---|
| CN | 105319322 A | | 2/2016 |
| CN | 103345573 B | | 6/2016 |
| CN | 105809271 A | | 7/2016 |
| CN | 106384171 A | | 2/2017 |
| CN | 106568899 A | * | 4/2017 |
| CN | 108647889 A | | 10/2018 |
| CN | 111257505 A | | 6/2020 |
| CN | 111340644 A | | 6/2020 |
| CN | 112287287 A | | 1/2021 |
| CN | 112884088 A | | 6/2021 |
| CN | 113204998 A | * | 8/2021 |
| CN | 113449976 A | * | 9/2021 |
| WO | WO-03069315 A1 | * | 8/2003 ............ G01S 13/89 |

OTHER PUBLICATIONS

Glick et al. ("Spatially-explicit models of global tree density," Scientific Data, V.3, Aug. 16, 2016) (Year: 2016).*

Woodall et al. ("Relative density of United States forests has shifted to higher levels over last two decades with important implications for future dynamics," Scientific Reports, 2021 (11); Sep. 22, 2021) (Year: 2021).*

Markov chain Monte Carlo, Wikipedia, retrieved from https://en.wikipedia.org/wiki/Markov_chain_Monte_Carlo, on Nov. 17, 2021, 8 pages.

Salo | Our approach, retrieved on Oct. 20, 2021, from https://salo.ai/approach, 4 pages.

Forest Inventory and Analysis National Program, retrieved on Oct. 20, 2021, from https://www.fia.fs.fed.us/, 2 pages.

Digital Innovations—USDA Forest Service, retrieved on Oct. 20, 2021, from https://www.arcgis.com/apps/MapSeries/index.html?appid=04bfa9d986bd48b4bae3d96387641203, 16 pages.

Conservation Science Partners, retrieved on Oct. 20, 2021, from https://www.arcgis.com/apps/MapSeries/index.html?appid=04bfa9d986bd48b4bae3d96387641203, 5 pages.

Planetary Scale Geoprocessing | API | Hosted Environment, retrieved on Oct. 20, 2021, from https://www.arcgis.com/apps/MapSeries/index.html?appid=04bfa9d986bd48b4bae3d96387641203, 11 pages.

* cited by examiner

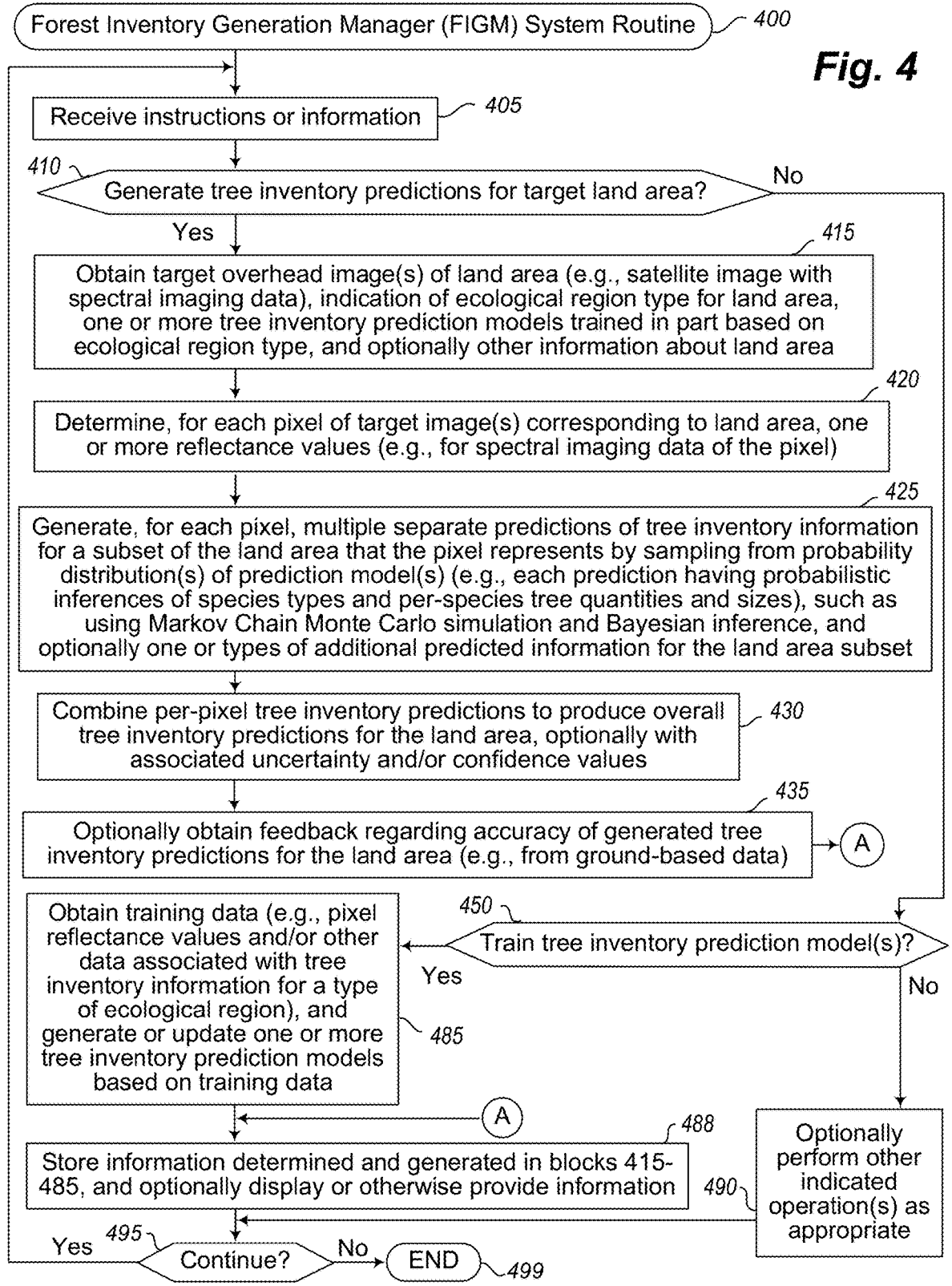

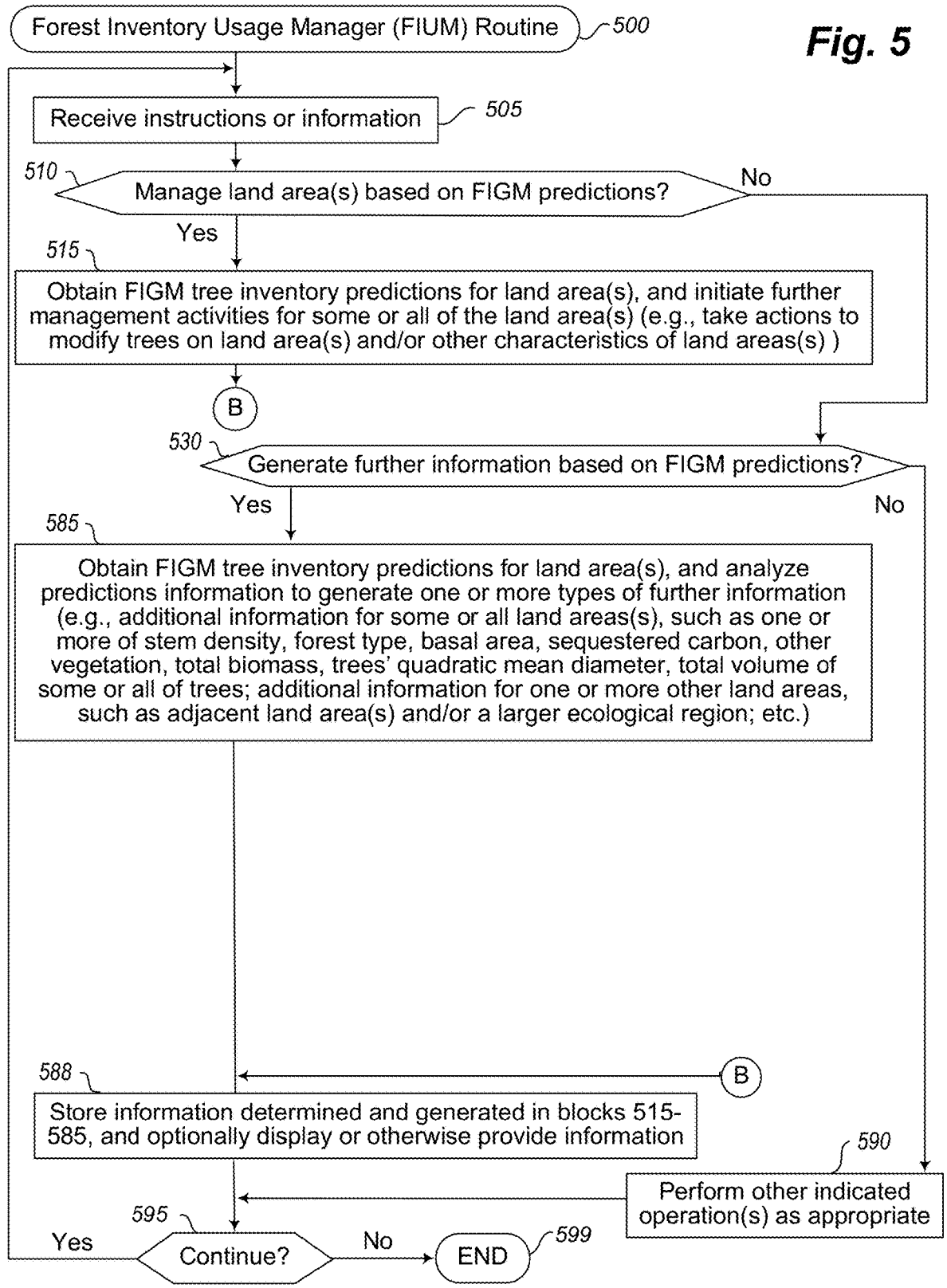

AUTOMATED DETERMINATION OF TREE INVENTORIES IN ECOLOGICAL REGIONS USING PROBABILISTIC ANALYSIS OF OVERHEAD IMAGES

TECHNICAL FIELD

The following disclosure relates generally to techniques for automatically determining tree inventory information for an area of land based at least in part on analyzing visual data of overhead image(s) of that land area, such as by using information about an ecological region to which the land area belongs as part of probabilistically determining tree species and quantities for the land area, and for subsequently using the determined tree inventory information in one or more manners such as to improve management of trees in that land area.

BACKGROUND

It would be useful to have information about trees that are present on an area of land (such as tree species and quantities) without having to physically travel to and manually enumerate the trees there, such as to assist in managing the trees. Some prior attempts have been made to estimate a limited amount of data about trees present on an area of land without physically entering that area, such as by using information that is obtained from physically surveying trees present on a nearby land sample—for example, U.S. Pat. No. 10,467,475 entitled "Forest Inventory Assessment Using Remote Sensing Data" (Yale University) describes methods and systems to inventory a target plot of trees by extrapolating known tree information for a different sample plot and using data that includes one or more images of the target plot, optionally along with other data.

However, it can be difficult to effectively determine and represent tree information for an area of land without physically traveling to and manually enumerating the trees that are present there, including when using the techniques of prior attempts to generate such tree information. Problems with such techniques include accurately estimating tree species and quantities for an area of land, such as when known tree information for a different sample plot does not accurately reflect the trees that are actually present on the area of land, as well as estimating other types of information about the area of land.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 4 illustrates an example flow diagram for a Forest Inventory Generation Manager (FIGM) system routine in accordance with an embodiment of the present disclosure.

FIG. 5 illustrates an example flow diagram for a Forest Inventory Usage Manager (FIUM) system routine in accordance with an embodiment of the present disclosure.

DETAILED DESCRIPTION

Figure 1:
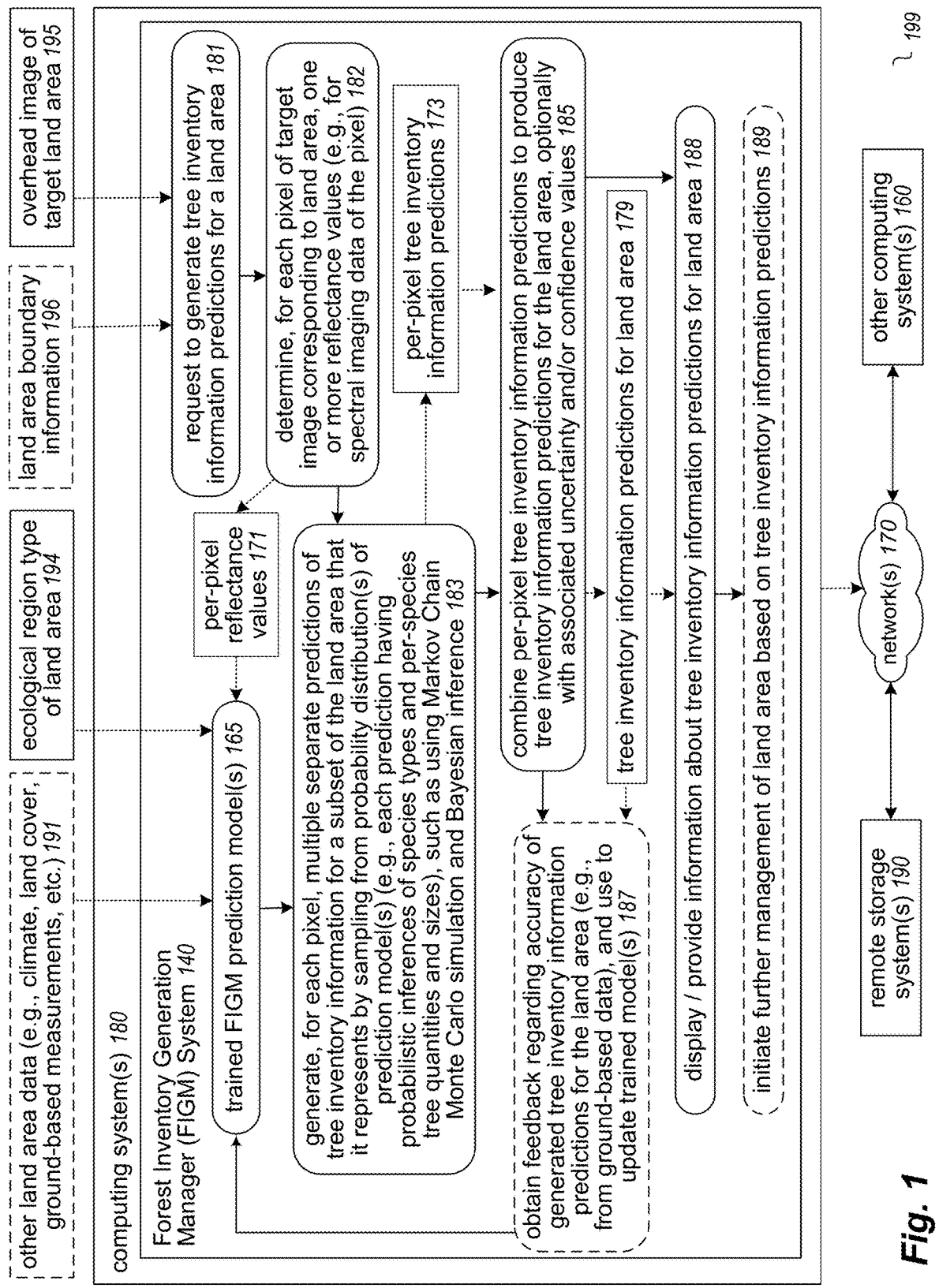
FIG. 1 is a diagram depicting example computing system(s) for use in embodiments of the present disclosure, including for automatically determining tree inventory information for an area of land based at least in part on analyzing visual data of overhead image(s) of that land area.

The present disclosure describes techniques for using computing devices to perform automated operations for determining tree inventory information for an area of land based at least in part on analyzing visual data of overhead image(s) of that land area, such as by using a trained prediction model specific to an ecological region to which the land area belongs as part of probabilistically determining multiple types of information about trees in that land area, and for subsequently using the determined tree inventory information in one or more manners (e.g., to improve management of trees in that land area). The images may, for example, include satellite images and/or other overhead images (e.g., from airplanes, flying drones, etc.) that include at least visible light data (e.g., spectral images) for an area of land, referred to generally herein at times as a 'target area of land' or 'target land area', and may in some situations and embodiments be used in combination with additional types of information about the target land area. In addition, the determined tree inventory information for the target land area may include various types of information about the trees present on the target land area, such as, for example, predictions of one or more of the following: particular tree species present on the target land area, quantities of each of the tree species, sizes of the trees (e.g., diameter, height, volume, etc.), aggregate tree information for the target land area (e.g., tree basal area, live tree biomass, forest type, tree system density, etc.) and other characteristics of the trees (e.g., deciduous or coniferous, tree genuses or tree groupings other than based on tree species, tree quadratic mean diameter, etc.), additional types of related information, etc. Additional details are included below regarding the automated determination of tree inventory information for a target land area, and some or all of the techniques described herein may be performed via automated operations of a Forest Inventory Generation Manager ("FIGM") system in at least some embodiments, as discussed further below.

In addition, the tree inventory information that is determined for a target land area may be used in at least some embodiments for managing the trees on the target land area, such as in one or more of the following manners: determining additional trees to plant on the target land area; determining moisture and/or other materials to add to the target land area; determining additional activities to perform on the target land area, such as to prune or otherwise manipulate trees on the target land area, to clear underbrush to reduce fire risk, etc.; determining trees to remove from the target land area, such as for invasive species; etc. In addition, the determined tree inventory information for a target land area may be further used in various other manners in various embodiments, whether in addition to or instead of managing the trees on the target land area, such as to determine tree attributes that correspond to fuel loads or are otherwise associated with fire risk, to determine aggregate attributes of the trees on the target land area (e.g., carbon sequestration value, total merchantable volume, timber value, etc.), to determine soil attributes related to tree growth, etc. Additional details are included below regarding the use of automatically determined tree inventory information for a target land area, and some or all of the techniques described herein may be performed via automated operations of a Forest Inventory Usage Manager ("FIUM") system in at least some embodiments, as discussed further below.

As noted above, automated operations of an FIGM system may include determining tree inventory information for a target land area land based at least in part on analyzing visual data of overhead image(s) of that target land area. In some embodiments, such automated operations may include obtaining one or more overhead images of the target land area, such as a composite overhead image that includes a mosaic of image sub-portions from multiple images for the target land area over a specified period of time (e.g., in situations in which none of the multiple images individually includes visual data for all of the target land area, to address situations in which portions of the land area are obscured by clouds or other factors in some but not all of the multiple images, etc.). A composite overhead image or other overhead image may, for example, include spectral visual data (e.g., values for channels such as RGB, or red/green/blue channels, near-infrared, etc.), and may be taken from various heights and/or with various resolutions, such as for each pixel in such a composite overhead image or other overhead image to correspond to approximately a 30 meter by 30 meter portion of the target land area, or instead to a larger or smaller portion of the target land area. In addition, further data about the target land area may be obtained and used in combination with the one or more overhead images in at least some embodiments and situations, such as from proprietary and/or public sources, and such as one or more of the following types of further data: boundaries of the target land area, or other definition of the target land area; the ecological region to which the target land area belongs (e.g., level III ecological regions as defined by the Environmental Protection Agency (EPA) or promulgated by the Commission For Ecological Cooperation); a land cover classification for the target land area (e.g., as defined by the U.S. Geological Service); climate data for the target land area (e.g., one or more of temperature, precipitation, solar radiation, wind speed, water vapor pressure, etc., and whether historical and/or current climate data); ground-level data for the target land area (e.g., about one or more particular trees on the target land area; regarding other information about the target land area such as related to one or more of soils, topography information such as elevation and/or slope and/or aspect, etc., and optionally gathered by one or more users by hand and/or via sensors on or above the target land area, such as imaging sensors and/or other types of sensors, and such as by users associated with an operator of the FIGM system and/or independent third-party users); lidar data; radar data; chemical data, such as to correspond to pollen plumes and/or other attributes of the trees or other elements of the target land area; prior tree inventory information for some or all of the target land area, such as from one or more earlier times, and whether previously generated by the FIGM system or another source; metadata about the overhead images and/or further data, such as to represent how particular types of data are collected and/or what the collected data values represent (e.g., in information about a manual tree count is included, about what and/or other characteristics of the trees in the count); etc. In some embodiments and situations, some or all of the overhead image(s) and/or other further data for a target land area may be captured dynamically at a time of tree inventory information determination for the target land area (e.g., in response to a request or instruction from an owner of the target land area or other entity to perform such a determination), and in some embodiments and situations, some or all of the overhead image(s) and/or other further data for a target land area may be previously captured, such as to be retrieved from storage at a time of use.

After the overhead image(s) and optionally further data for a target land area are obtained, the automated operations of the FIGM system may further include supplying the obtained information as input to a trained prediction model in at least some embodiments and situations, such as a prediction model that has been trained in a manner specific to the ecological region to which the target land area belongs, and such as to receive as output one or more predictions, based at least in part on one or more reflectance values for a pixel of an overhead image, of one or more values for tree inventory information for a portion of the target land area that the pixel represents. In at least some embodiments and situations, the trained prediction model is a Bayesian statistical model, and the automated operations use Bayesian inference and Markov Chain Monte Carlo simulation to generate multiple separate predictions (e.g., up to ten, tens, hundreds, a thousand, thousands, etc.) of the tree inventory information for the target land area portion to which a pixel corresponds (e.g., with each prediction corresponding to sampling from a probability distribution space represented by the trained prediction model)—the Bayesian statistical model that is used may be of different types in different embodiments (e.g., a Bayesian network, a neural network, a rule-based system, etc.), and may further produce one or more uncertainty values associated with each prediction. In embodiments in which multiple separate predictions are generated for a pixel (or other portion of an overhead image), the multiple separate predictions may then be combined to generate the determined tree inventory information for that pixel or other image portion (e.g., combined in a weighted or non-weighted manner, optionally by using uncertainty information or other information associated with a prediction for such weighting). In addition, the automated operations of the FIGM system may further include training one or more such prediction models (e.g., one for each ecological region in a country or other land area) before use, such as in a supervised manner by using labeled input data, or in other manners.

Additional details are included below regarding automated operations of an FIGM system and/or FIUM system. In addition, in some embodiments, the automated operations of the FIGM and/or FIUM systems may include obtaining input information of one or more types from one or more users (e.g., system operator users of the FIGM and/or FIUM systems that assist in their operations, end users that obtain results of information from the FIGM and/or FIUM systems, end users that supply input information to the FIGM and/or FIUM systems, etc.), such as to be incorporated into subsequent automated analyses in various manners, including to replace or supplement automatically generated information of the same type, to be used as constraints and/or prior probabilities during later automated analysis (e.g., by a trained prediction model), etc.

The described techniques provide various benefits in various embodiments, including to allow information about particular types of trees on a target land area to be determined with greater accuracy and greater speed than prior techniques, as well as to determine additional types of tree inventory information using overhead images and optionally further data than are available from prior techniques. Such described techniques further provide benefits in use of the determined tree inventory information, including to enable further management of a target land area in a fully automated manner and/or to direct further related human activities. In addition, in some embodiments, the described techniques may be used to provide an improved GUI in which a user may more accurately and quickly obtain information about the tree inventory information for a target land area, including in response to search requests, as part of providing personalized information to the user, as part of providing value estimates and/or other information about the target land area to a user, etc. Various other benefits are also provided by the described techniques, some of which are further described elsewhere herein.

For illustrative purposes, some embodiments are described below in which specific types of information are acquired, used and/or presented in specific ways for specific types of structures and by using specific types of devices—however, it will be understood that the described techniques may be used in other manners in other embodiments, and that the invention is thus not limited to the exemplary details provided. As one non-exclusive example, while particular types of tree inventory information are determined for particular types of target land areas in particular manners, it will be appreciated that other types of information may be similarly determined in other embodiments, including for other types of land areas and/or water areas, and/or in other manners—for example, the described techniques may be used to predict and provide inventory information for types of vegetation other than trees (e.g., grassland, shrubs, commercial crops, algae blooms, seaweed, alpine tundra or other tundra, Mediterranean woodlands and scrub, xeric shrubland, dry steppe, grass and/or tree savanna, etc.) and/or other surface coverings (e.g., desert or semi-desert, ice sheet, water, etc.) using corresponding trained prediction models. In addition, while in some embodiments the predicted inventory information is generated for each pixel whose visual data covers a corresponding part of an area of land (or area of other surface covering), in other embodiments the prediction may be performed in other manners, such as for groups of multiple pixels (e.g., some or all pixels of an image), by handling missing data (e.g., corresponding to pixels whose visual data of a corresponding surface of land or other surface covering is obscured) in one or more manners (e.g., extrapolating and/or interpolating using other related information, such as to handle a pixel with missing data by using data from one or more adjacent or otherwise nearby pixels), etc. Furthermore, the terms "acquire" or "capture" as used herein with reference to obtaining images and/or other data may (unless context clearly indicates otherwise) refer to any recording, storage, or logging of media, sensor data, and/or other information related to spatial and/or visual characteristics and/or otherwise perceivable characteristics, such as by a recording device or by another device that receives information from the recording device. In addition, various details are provided in the drawings and text for exemplary purposes, but are not intended to limit the scope of the invention. For example, sizes and relative positions of elements in the drawings are not necessarily drawn to scale, with some details omitted and/or provided with greater prominence (e.g., via size and positioning) to enhance legibility and/or clarity. Furthermore, identical reference numbers may be used in the drawings to identify similar elements or acts.

FIG. 1 is a block diagram illustrating an overview of various example systems that may participate in the described techniques in some embodiments, including to automatically determine tree inventory information for an area of land (e.g., for a forest of trees on that land area) based at least in part on analyzing visual data of overhead image(s) of that land area. In the illustrated example of FIG. 1, an FIGM system 140 is executing on one or more computing systems 180, and in this example receives as input one or more overhead images of the land area 195, an ecological region type of the land area of 194, optionally boundaries of the land area or other definition 196 of the land area (e.g., if the land area corresponds to only a subset of the overhead image(s)), and optionally other data related to the land area (e.g., related to climate information, land cover information, ground-based measurements taken from the land area of one or more types, etc.). In particular, the system 140 performs steps that include receiving a request or instructions at step 181 to generate tree inventory information for a land area, including to obtain the overhead image(s) and optionally the land area boundary information—in some embodiments and situations, the request 181 may receive an indication of one or more target land areas of interest, and the FIGM system may retrieve (e.g., from storage) some or all of the input information 191-196 for each such target land area.

In this example, the automated operations continue from step 181 to step 182, where the system 140 determines, for each pixel of the one or more overhead images that correspond to the land area, one or more reflectance values, such as by using spectral imaging data for the pixel, with corresponding per-pixel reflectance values 171 being output. The automated operations then continue to step 183 where, for each pixel, multiple separate predictions are generated of tree inventory information for a subset of the land area that corresponds to the pixel, and are output as information 173. The operations of step 183 may include using one or more trained FIGM prediction models (e.g., that are trained specific to the ecological region type 194 of the land area), and performing repeated sampling from one or more probability distributions of the one or more prediction models to generate the multiple separate predictions (e.g., by using Markov Chain Monte Carlo simulation), with each prediction having probabilistic inferences of species types in that land area subset and of per-species tree quantities and sizes for that land area subset (e.g., by using Bayesian inference techniques). In particular, the prediction model(s) 165 take as input the per-pixel reflectance values 171, the optional other land area data 191 if available, and optionally the ecological region type of the land area 194 (e.g., for use in selecting from different prediction models trained for different ecological region types), and outputs the per-pixel multiple predictions of tree inventory information. After step 183, the automated operations continue to step 185 where the per-pixel tree inventory information predictions for each pixel are combined to produce overall tree inventory information predictions for the land area subset corresponding to that pixel, optionally with associated uncertainty information based on different values from the multiple separate predictions. The automated operations of step 185 further include combining the overall tree inventory information predictions for the various pixels to generate the resulting overall tree inventory information predictions 179 for the land area. In some embodiments and situations, the automated operations may further include performing step 187 to obtain feedback regarding accuracy of the generated tree inventory information predictions for the land area (e.g., at a later time, such as based on later obtained ground-based data measurements corresponding to at least a portion of the land area), and if so may use that feedback to update the one or more trained models for the ecological region type corresponding to the land area (e.g., by performing further training using the feedback, such as corrected actual values for one or more types of the predicted tree inventory information values).

Automated operations further continue after step 185 to step 188 where information about the tree inventory information predictions for the land area are displayed or otherwise provided (e.g., are stored for later use), including in some embodiments to optionally further proceed to step 189 to initiate further management of the land area based on the tree inventory information predictions (e.g., by a separate FIUM system, not shown). While each land area may have only a single corresponding trained prediction model in some embodiments, in other embodiments multiple different prediction models may be used for a given land area, such as multiple different prediction models that are trained for different levels of the ecological region type to which the land area belongs (e.g., a first prediction model trained for a level III ecological region to which the land area belongs, a second prediction model trained for a level IV ecological region to which the land area belongs, etc.).

In the environment of FIG. 1, one or more other remote storage systems 190 and/or other computing systems 160 may further interact with the one or more computing systems 180 via one or more networks 170. The network(s) 170 may be one or more publicly accessible linked networks, possibly operated by various distinct parties, such as the Internet, or may instead have other forms (e.g., a private network, such as a corporate or university network that is wholly or partially inaccessible to non-privileged users; a combination of both private and public networks, with one or more of the private networks having access to and/or from one or more of the public networks; etc.)—furthermore, the network(s) 170 may include various types of wired and/or wireless networks in various situations. The one or more remote storage systems 190 may, for example, store the tree inventory information predictions 179 that are generated for the land area, and/or may store and provide some or all of the input information 191-196 for the FIGM system. In addition, the one or more other computing systems 160 may, for example, execute an embodiment of a separate FIUM system (not shown) to further use the tree inventory information predictions 179, and/or may be used by one or more users that interact with the FIGM and/or FIUM systems or their output information. For example, in at least some embodiments and situations, one or more system operator users (not shown) of FIGM client computing systems 160 may optionally further interact over the network(s) 170 with the FIGM system 140, such as to assist with some of the automated operations of the FIGM system and/or for subsequently using information determined and generated by the FIGM system in one or more further automated manners. One or more other end users (not shown) of one or more other client computing systems 160 may further interact over one or more computer networks 170 with the FIGM system 140 and optionally the FIUM system, such as to obtain and use the generated tree inventory information predictions 179 and/or other output of the FIUM system. The computing and storage systems 140, 160 and 190 may include various hardware components and stored information, as discussed in greater detail below with respect to FIG. 3.

Various details are provided with respect to FIG. 1, but it will be appreciated that the provided details are non-exclusive examples included for illustrative purposes, and other embodiments may be performed in other manners without some or all such details. Additional details are included elsewhere herein corresponding to automated operations of the FIGM system, including with respect to FIGS. 2A-2K and FIG. 4. Similarly, additional details are included elsewhere herein corresponding to automated operations of the FIUM system, including with respect to FIG. 5.

FIGS. 2A-2K illustrate examples of automated operations corresponding to use of the FIGM system for analyzing visual data of overhead image(s) of a land area and determining tree inventory information for the area of land, such as in a manner similar to that discussed with respect to FIG. 1 and elsewhere herein.

Figure 2A:
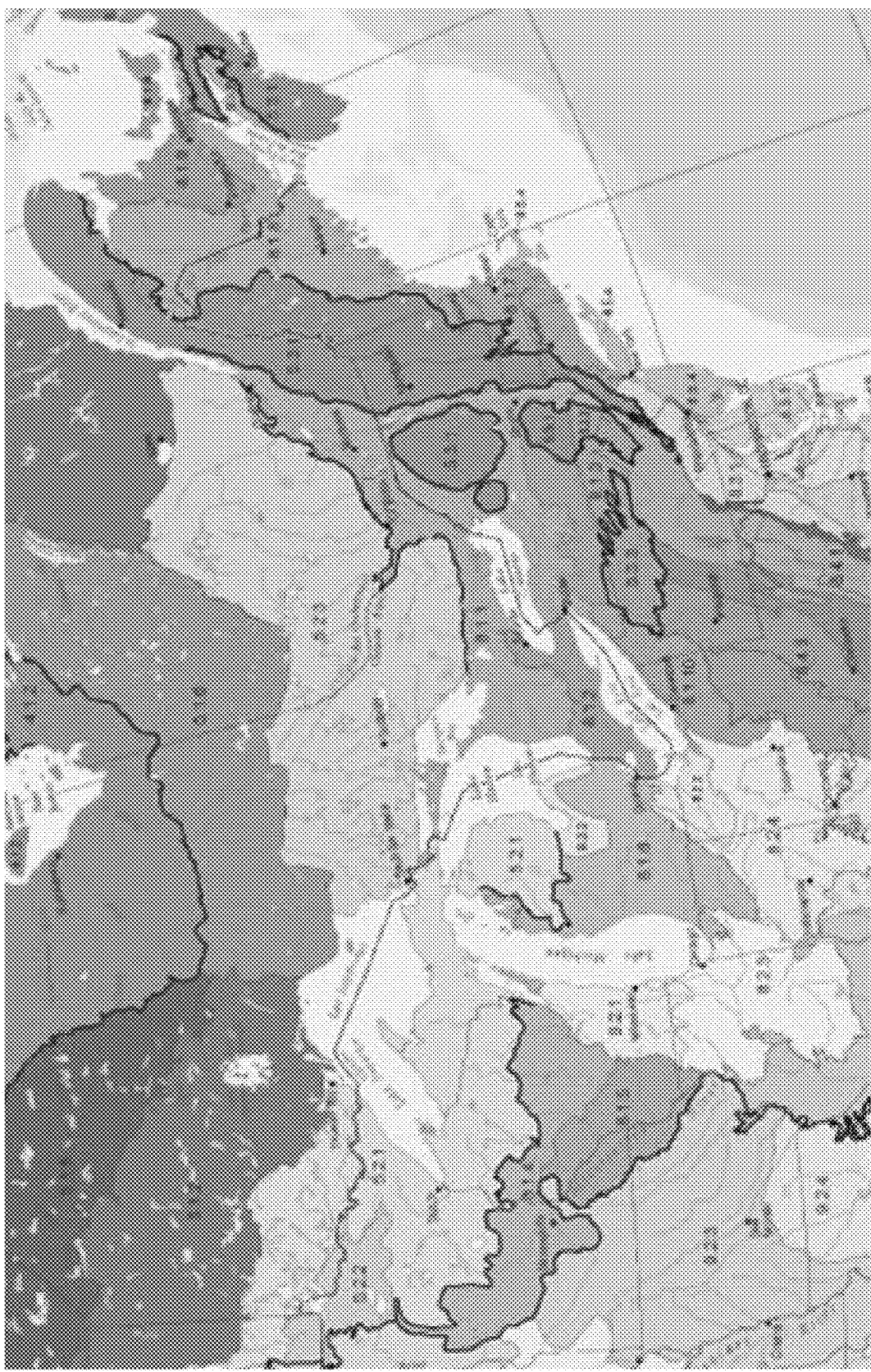
FIGS. 2A-2K illustrate examples of automated operations for analyzing visual data of overhead image(s) of a land area and determining tree inventory information for the area of land.
Figure 2B:
Figure 2C:
Figure 2D:

In particular, FIG. 2A illustrates information 205a that illustrates a portion of North America showing ecological regions of levels I through III, such as promulgated by cec.org, with examples of some of the ecological regions shown including the following:

5.0 Northern Forests
   5.1 Softwood Shield
      5.1.1 Athabasca Plain and Churchill River Upland
      5.1.2 Lake Nipigon and Lac Seul Upland
      5.1.3 Central Laurentians and Mecatina Plateau
      5.1.4 Newfoundland Island
      5.1.5 Hayes River Upland and Big Trout Lake
      5.1.6 Abitibi Plains and Riviere Rupert Plateau
   5.2 Mixed Wood Shield
      5.2.1 Northern Lakes and Forests
      5.2.2 Northern Minnesota Wetlands
      5.2.3 Algonquin/Southern Laurentians
   5.3 Atlantic Highlands
      5.3.1 Northern Appalachian and Atlantic Maritime Highlands
      5.3.3 North Central Appalachians
   5.4 Boreal Plain
      5.4.1 Mid-Boreal Uplands and Peace-Wabaska Lowlands
      5.4.2 Clear Hills and Western Alberta Upland
      5.4.3 Mid-Boreal Lowland and Interlake Plain FIG. 2B continues the example of FIG. 2A, and illustrates similar information 205b that shows ecological regions of level IV for a similar geographical area, such as to include one or more target land areas to be further analyzed (e.g., that corresponds to part of the level III ecological region 5.2.1 shown in FIG. 2A), and with one or more of the level IV ecological regions shown in pink corresponding to part of the state of Michigan, and with one or more of the level IV ecological regions shown in brown corresponding to parts of the states of Wisconsin and Minnesota. FIGS. 2C and 2D further continue the examples of FIGS. 2A-2B, with FIG. 2C illustrating additional information corresponding to part of the state of Michigan, and FIG. 2D illustrating additional information corresponding to parts of the states of Wisconsin and Minnesota, as discussed further below.

In one particular non-exclusive example embodiment, the different colors shown in FIG. 2B may correspond to different geographical area chunks for which the FIGM system performs various preprocessing before tree inventory information predictions are determined for a particular land area, such as to train one or more corresponding prediction models specific to different level III ecological regions. As part of such preprocessing, an embodiment of the FIGM system chuck may obtain input information for each geographical area that includes, for example, some or all of the following: geographical boundaries (bounds); ground measurement data (e.g., plot data); satellite imagery (e.g., from Sentinel 2 and/or Landsat 8); land classification data (e.g., from the National Land Cover Database; estimate of year of last disturbance from the University of Maryland's Global Forest Change data; etc.); auxiliary raster data (e.g., climate data); etc. With respect to bounds, they may be chosen for a geographical area chunk based at least in part on the availability of seamless image data for that geographical area, such as to obtain and use a leaf-on Sentinel mosaic image for forest density and species composition models (e.g., based on multiple constituent images that have similar spectral conditions and that do not cross seasonal boundaries, such as summer months June through August, or just July and August for mountainous areas to minimize the amount of snow at high elevation). The image 205c of FIG. 2C illustrates a false color composite preview of a cloud-free Sentinel mosaic that covers three orbits. With respect to plots, information from the U.S. Forestry Service (USFS) Forest Inventory and Analysis (FIA) database may be retrieved to obtain recently observed plot measurements for land areas in the United States (or similar data sources for other countries), with image 205d of FIG. 2D illustrating example FIA plot locations, such as from data for the 48 contiguous states and District of Columbia of the United States (CONUS). With respect to climate data, it may be obtained from, for example, WorldClim climate raster data.

Figure 2E:
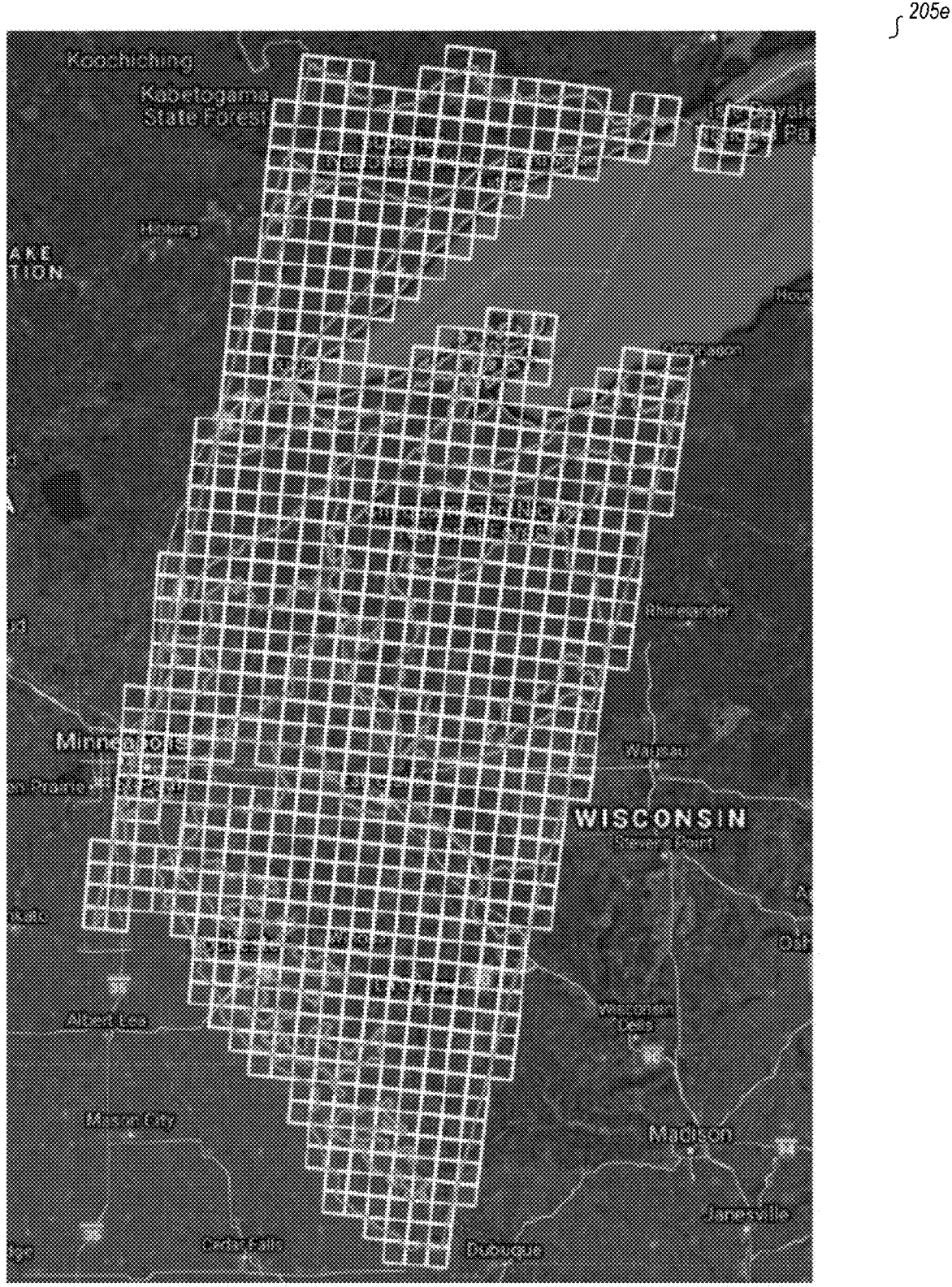
Figure 2F:
Figure 2G:
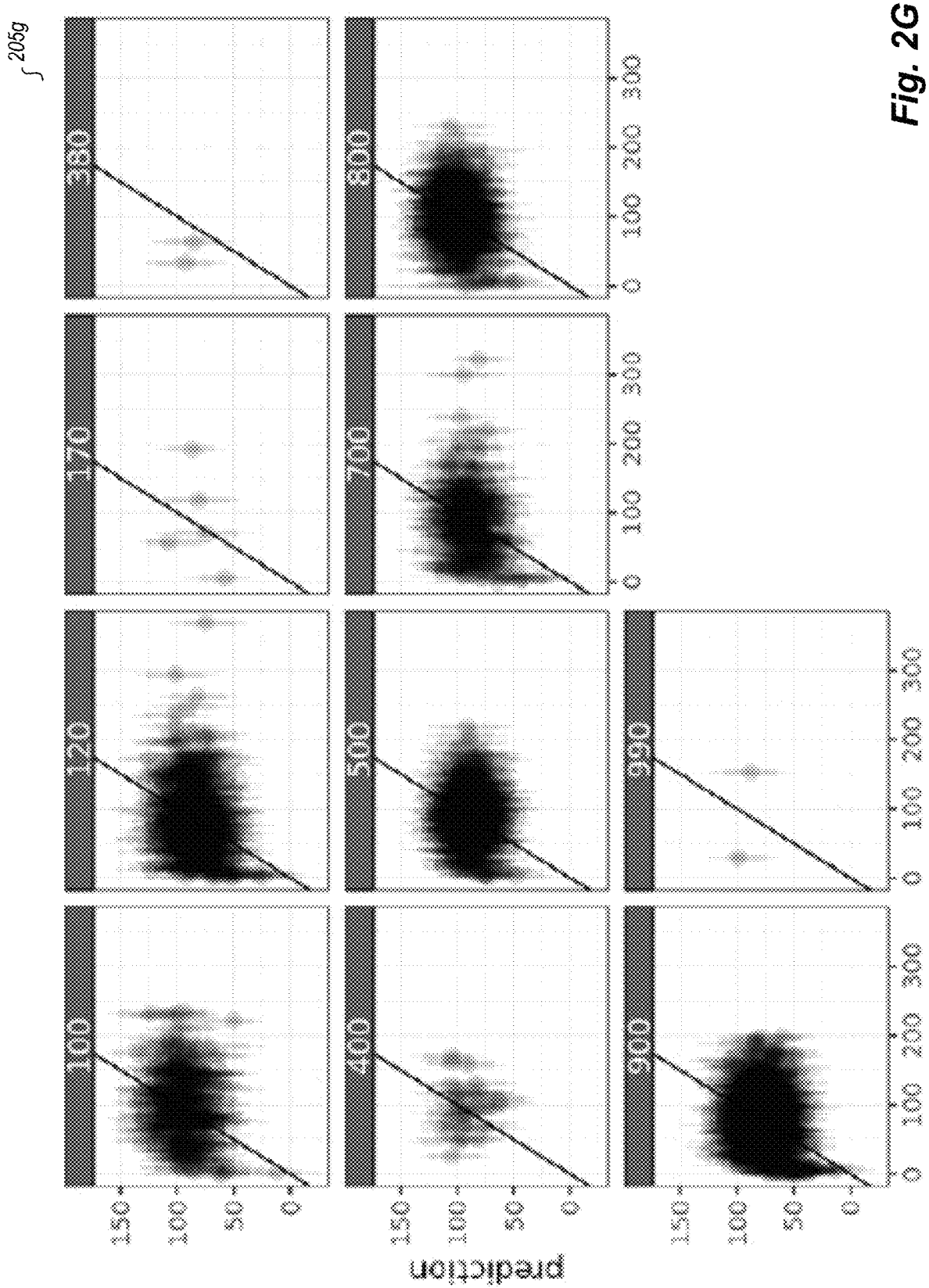
Figure 2H:
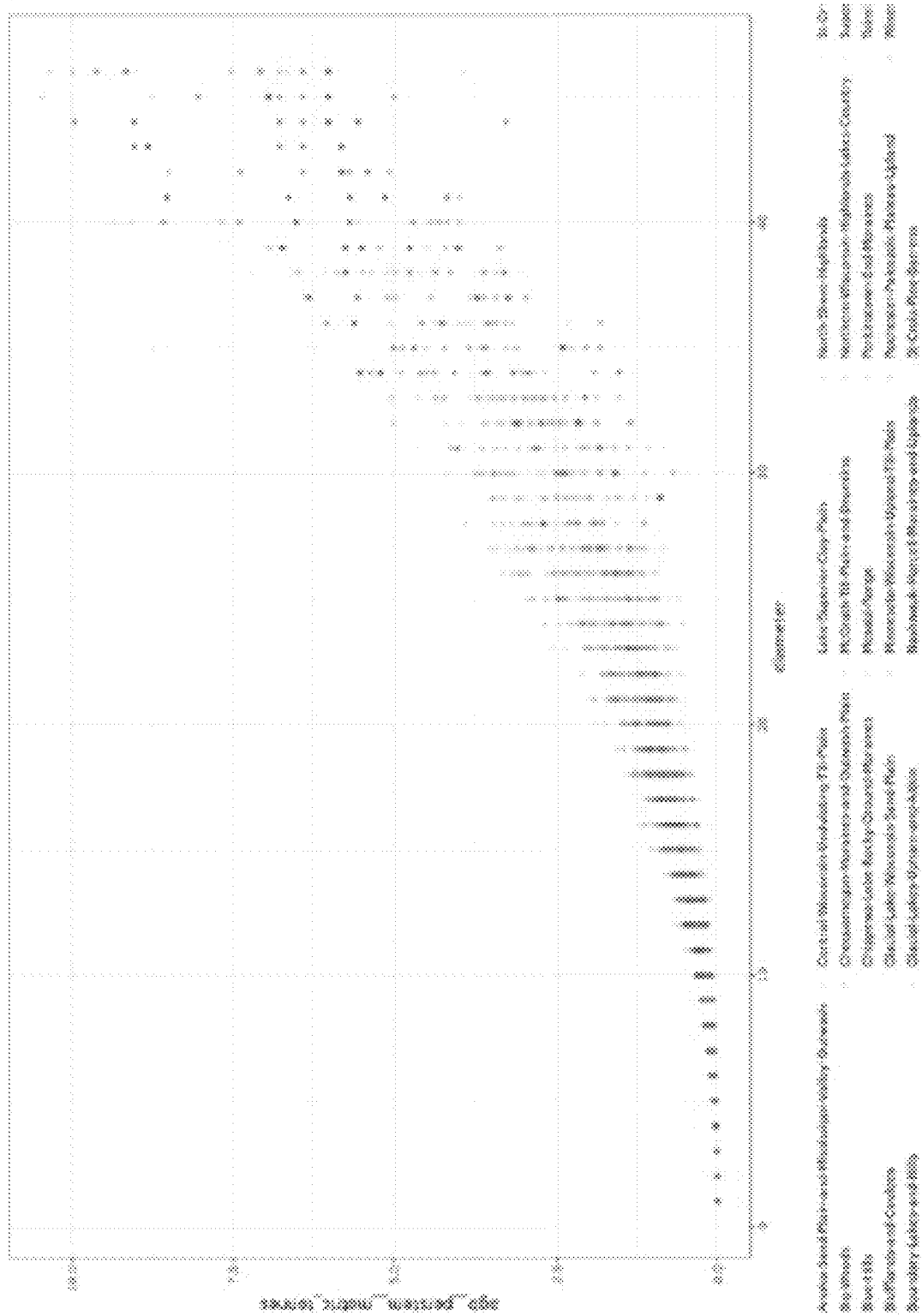

FIG. 2E continues the examples of FIGS. 2A-2D, and illustrates an image 205e corresponding to image 205d of FIG. 2D, and in which evenly sized squares are shown, such as for use in breaking the preprocessing activities into smaller processing units. FIG. 2F continues the examples of FIGS. 2A-2E, and illustrates an image 205f in which a forest/non-forest mask is applied to exclude pixels that do not correspond to forest areas (e.g., to exclude water and other non-forested areas), such as using data about forested and shrub classes from the National Land Cover Database (NLCD) from the U.S. Geological Survey (USGS), and with green pixels corresponding to forested pixels. The various inputs may then be applied to train a prediction model, as discussed in greater detail below, with FIGS. 2G and 2H continuing the examples of FIGS. 2A-2F, including illustrating an image 205g in FIG. 2G in which model diagnostics for total basal area model have been fit to FIA data paired with auxiliary raster inputs (with each panel representing a different forest type group), and illustrating an image 205h in FIG. 2H to show a diameter:biomass relationship for the trees.

Figure 2I:
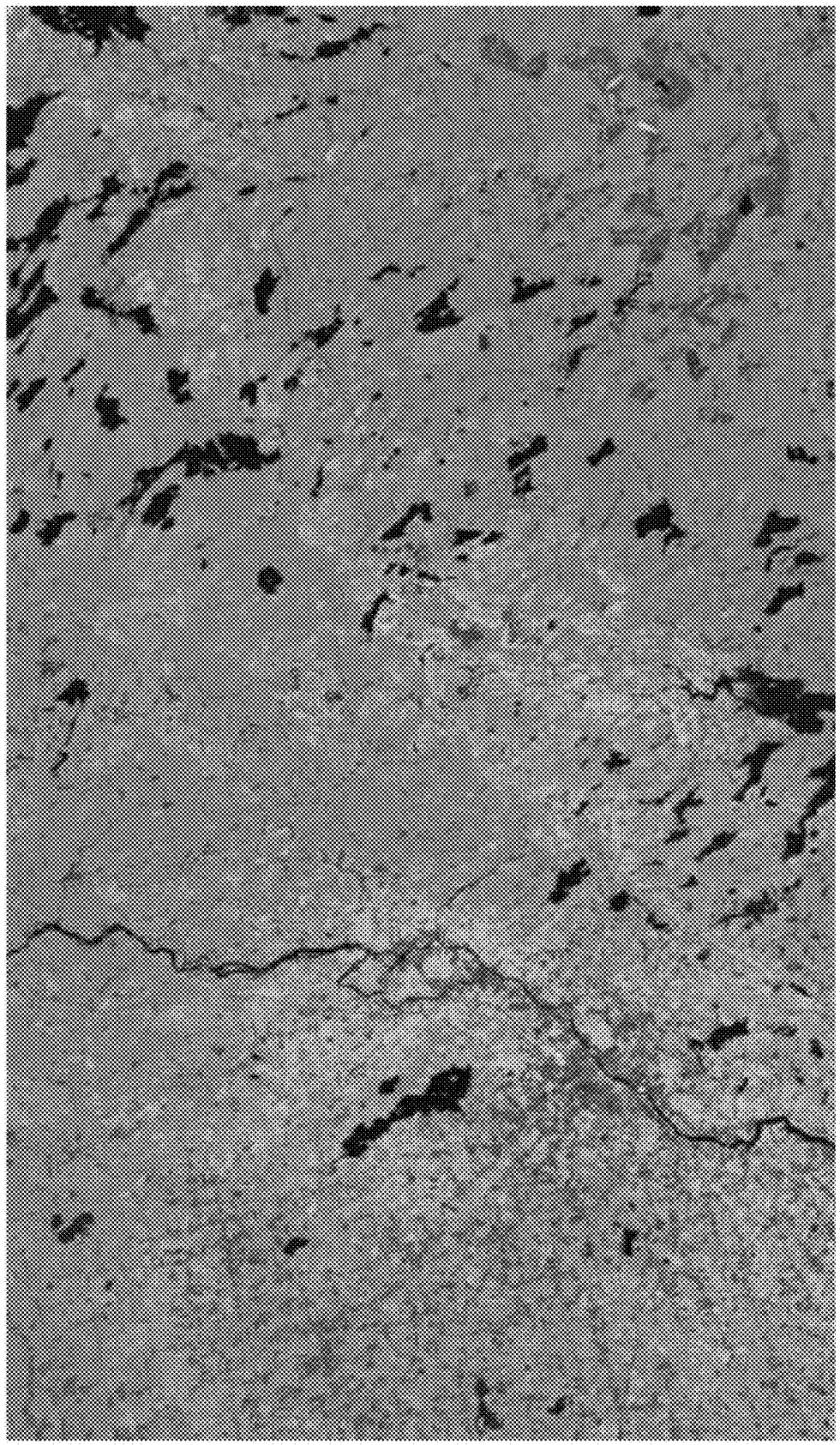
Figure 2J:
Figure 2K:
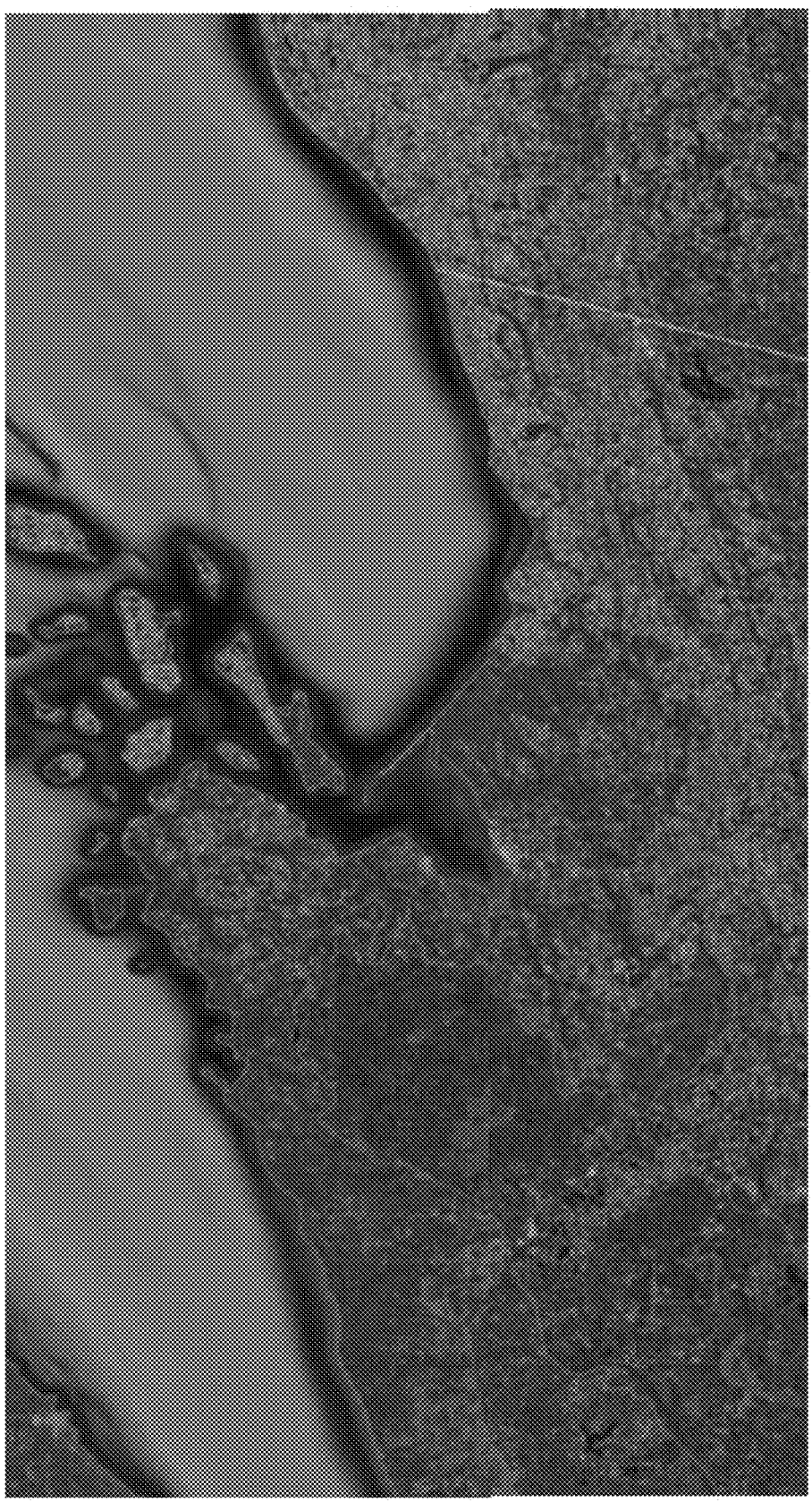

FIGS. 2I-2K further provide examples of using the trained prediction model to determine predicted tree inventory information for a target land area. In particular, in the non-exclusive example embodiment, predictions may be obtained of total density, forest type, and species composition, including assigning diameter distribution predictions, rendering a so-called 'treelist' with a predicted number of trees per species and diameter for each pixel, and adding stem-level carbon and biomass estimates. In particular, FIG. 2I illustrates an image 205i that shows predictions for forest type groups (e.g., rainforest or equatorial moist evergreen, tropical deciduous forest, Mediterranean forest, temperate broad-leaved deciduous and mixed forest, warm temperate broad-leaved deciduous forest, taiga, subtropical moist forest, monsoon forest, tropical and subtropical dry forest, montane forest, etc.) in Maine, with different forest type groups being represented by different colors. FIG. 2J illustrates an image 205j that shows point estimates of pixel-level basal area and stem density, with yellow corresponding to high density and purple corresponding to low density. FIG. 2K illustrates an image 205k that shows species-specific basal area per acre, trees per acre, and carbon stocking, such as for a sugar maple species basal area in northern Wisconsin and Michigan's Upper Peninsula, and with areas without color predicted to have no sugar maple trees. Additional details are included below regarding generating such predicted tree inventory information for a target land area.

With respect to one non-exclusive example embodiment, the FIGM system may perform automated operations to generate predicted tree counts by diameter and species for every pixel area (e.g., 30 m by 30 m) in a geographical area of interest (e.g., CONUS). Doing so may include building hierarchical statistical models that use some or all of the following inputs: US Forest Service FIA data; National Land Cover Database (NLCD) forest cover Ecoregions of North America level III boundaries; remotely sensed multi-spectral information from Sentinel 2 and/or Landsat 8 satellite images; WorldClim climate raster data; etc. As previously noted, preprocessing activities may include using NLCD to determine what areas of CONUS are forest/non-forest, and separating the geographical area of interest into level III ecoregion boundaries. Spectral information may be cropped to the forest mask boundaries, and one or more spectral principal components may be generated for further use (e.g., one or more principal components using the entire imagery stack, and one or more principal components using only leaf-on imagery), as well as one or more climate data principal components. Additional processing may optionally be performed with respect to FIA plots and associated definitions of geographical area portions. The various information may then be used to predict which trees occur in every forested pixel, and their stem sizes, as well as to predict forest type, and to predict other tree information conditional on the predicted forest type. As part of validation of a trained predictive model, prior and posterior predictive checks may be used to assess how the predictions from the model compare to actual data, such as with respect to the accuracy and/or precision of the predicted distribution of stems and stem diameters. In addition, approximate 'leave one out' cross validation may be used to approximate what would happen if one plot at a time is held out of the training data, such as to measure performance, and to assist in identifying overfitting and poor fit to the distribution of stem counts.

Continuing with a non-exclusive example embodiment, predicted information may include live tree biomass and volume based on predictions of other tree inventory information, as well as sequestered carbon—in this example embodiment, that may be done via a joint modeling framework that links biomass/carbon with allometrically modeled volume. Biomass refers to the "green weight" of trees (all of their stored carbon plus an average amount of water, nutrients, trace minerals, etc.), and may be used to estimate carbon sequestration storage (e.g., as one half of a tree's biomass). In this example embodiment, the basic steps to obtaining live above-ground volume, biomass, and carbon for a single tree include the following: predict bole volume (meter cubed) using tree-level (species; diameter at breast height, or dbh; total height; etc.) and potentially stand-level (e.g., basal area, etc.) variables; predict green wood density (GWD) using tree-level (e.g., species, functional group, etc.) and potentially environmental (e.g., climate, etc.) variables; estimate bole biomass (kg) as bole volume*GWD; estimate biomass of remaining components (stump, bark, crown) through component sub-models; and calculate total live tree aboveground biomass as the sum of all components. Biomass and carbon may be estimated using, for example, the component ratio method (CRM) described by "Methods And Equations For Estimating Aboveground Volume, Biomass, And Carbon For Trees In The U.S. Forest Inventory, 2010" by Christopher W. Woodall et al., 2011 (hereinafter "Woodall 2011"), and to form class tables to estimate volume. Bole volume may be estimated by using a set of volume equations maintained by FIA to estimate gross cubic-foot volume, and a second set of equations to convert these to sound volume (volume accounting for potential loss due to damage or disease). Bole biomass may be estimated using a conversion from cubic-foot sound bole volume to bole biomass (in pounds, or 'lbs') is done with species-specific values of wood specific gravity (WSG). For example, bole biomass may be calculated as follows: bole wood biomass=bole volume×WSG×W, where WSG is the oven dry mass of green wood volume, and W is 62.4 pounds (a constant representing the weight of one cubic foot of water). Bole bark biomass may be calculated as follows: bole bark biomass=bole volume×BV%×BSG×W, where BV% is bark as a percent of volume (a species-specific constant from FIA), and BSG is over dry mass of green bark. Total bole biomass may be calculated as follows: total bole biomass=bole wood biomass+bole bark biomass. The remainder of a tree's aboveground biomass is estimated as stump and top, where stump biomass is estimated as follows: estimate stump volume (e.g., using equation 5 from Woodall 2011, also discussed in "Estimating Stump Volume" by Gerhard K. Raile 1982, hereinafter "Raile 1982"); calculate stump wood biomass using the same procedure applied to the bole; calculate stump bark biomass as a proportion of wood biomass; and calculate total stump biomass as the sum of stump wood and bark biomass; and where top biomass is estimated with an indirect procedure as follows: estimate total aboveground biomass (TAB) and stem (MST) and foliage biomass (FOL) (e.g., using equation(s) of "Comprehensive Database Of Diameter-Based Biomass Regressions For North American Tree Species" by Jennifer C. Jenkins et al. 2004, hereinafter "Jenkins 2004"); estimate stump biomass (STP) (e.g., using Raile 1982); estimate top biomass as TOP=TAB−MST−FOL−STP. Stump and top biomass can be corrected using the following adjustment factor: adj=bole biomass estimated from CRM/bole biomass. Once the biomass of all components has been estimated, total aboveground biomass is calculated as follows: total aboveground biomass=bole biomass+stump biomass+top biomass. For trees less than 5" dbh, total aboveground biomass can be predicted directly using allometric models (e.g., as described by Jenkins 2004) and then applying a sapling adjustment factor (e.g., using "Investigation into calculating tree biomass and carbon in the FIADB using a biomass expansion factor approach" by Linda S. Heath et al. 2009, hereinafter "Heath 2009") to align these predictions with the CRM.

In addition, in the non-exclusive example embodiment, a modified version of the CRM may alternatively be used, such as to further provide congruent volume and biomass estimates, and to facilitate posterior draws of joint volume and biomass predictions that can be applied to individual trees in posterior simulated tree lists (e.g., by including imprecision in the conversion of stem attributes to volume/carbon to improve uncertainty estimates). With respect to stem volume, rather than using FIA's volume equations or a generic allometric equation, a flexible taper model may be used, and trained using LegacyTreeData (available at legacytreedata.org) and additional taper datasets. Rather than a parametric taper equation, a hierarchical model may be implemented that more flexibly allows species/species group effects to be considered. By doing so, stump and bark information may be determined without using Raile 1982's stump volume model or the CRM approach for estimating bark volume is reliant on constants from FIA, instead using a taper approach to directly estimate wood and bark volume from ground to merchantable top. With respect to wood and bark density, a hierarchical model will be fit that predicts wood and bark density from available data (e.g., LegacyTreeData, the TRY Plant Trait database available at www.try-db.org, etc.) based on taxonomic and trait predictors, using a flexible model based on life history and phylogenetic factors influencing the density of wood and that can be applied at a continental scale, with a similar model for bark density being created and used. With respect to component biomass, rather than using CRM's indirect estimate, it can be directly predicted using a pipe model approach.

With respect to statistical models that estimate forest cover and composition in the non-exclusive example embodiment, multiple 'treelists' may be predicted for each pixel of an overhead image, with each treelist providing a list of tree species and their sizes and abundances that are present in a geographical area shown in the pixel, their sizes, with the multiple treelists representing samples from a potential probability distribution and corresponding to uncertainty in the predictions. This is analogous to a strategy used in Bayesian statistics of representing uncertainty in a quantity with many possible samples of that quantity, and with the statistical models that are generated and used each being implemented as a Bayesian statistical model that allows us to draw samples of treelists, including sub-models for stem counts and stem size.

With respect to a stem count sub-model, an ecological model may be used to describe the number of stems by species for an area, such as by using a Poisson model with exposure term for area. For example, consider plots i=1, . . . N and species j=1, . . . J, denote the expected stem density for plot i, species j as $\lambda_{i,j}$, and the number of stems as $n_{i,j}$, and the expected number of stems at a plot with area $a_i$ is the product of expected density and area as follows: $E(n_{i,j})=\lambda_{i,j}*a_i$. The realized number of stems may be modeled as a Poisson random variable as follows: $n_{i,j}$~Poisson$(\lambda_{i,j}*a_i)$. Stem density may be adequately represented using a plot-wide average, such that within-plot variation in stem density is not explicitly modeled, although it may be explicitly modeled in other embodiments. An observation model of the stem-count sub-model provides a connection between the ecological model and empirical data (e.g., FIA data), and represents the data collection process (e.g., stem size cut-offs), so as to flexibly model many different data collection processes and unify them into a single coherent modeling framework. The FIA data counts stems in two or three different ways for any plot, as follows: microplots, with stems counted if <5 inches DBH; subplots, with stems counted if >=5 inches DBH and (optionally, if macroplots are used)<a defined "macroplot breakpoint diameter" (if no macroplots, then subplots count all stems over 5 inches DBH); and optionally macroplots, with stems counted if >=macroplot breakpoint diameter (e.g., 24 inches DBH). To account for stem diameter cutoffs in count data, a Poisson-binomial hierarchy may be used to account for the way FIA counts stems, with a hierarchical model in which Y~Poisson($\lambda$) and X|Y~Binomial(Y,p), resulting in X~Poisson($\lambda$p). In addition, instead of simply considering $n_{i,j}$ stems at plot i of species j, an index may be added for plot type, such as to let $n_{i,j,k}$ represent the number of stems at plot i of species j at plot type k. The index k corresponds to microplots (k=1), subplots (k=2), and optionally macroplots (k=3). If $n_{i,j,k}$=1 stems occur in the microplot, then the FIA will only count the stems that are less than 5 in DBH—thus, the total number of stems may be modeled in a first stage, and in a second (e.g., hierarchical) stage the stem count $y_{i,j,k}=1$ may be modeled, and the probability that a stem gets counted is the probability that it is less than 5 in DBH. Stage 1 may model the total number of stems as $n_{i,j,k}$~Poisson$(\lambda_{i,j,k} * a_{i,k})$, and stage 2 may model the counted stems as $y_{i,j,k}$~Binomial$(n_{i,j,k}, p_{i,j,k})$, where $p_{i,j,k}$ is the probability that a stem is counted (e.g., the probability that a stem is less than 5 in DBH in an FIA microplot). This Poisson-Binomial hierarchy has an equivalent representation as a one-stage Poisson model, as follows: $y_{i,j,k}$~Poisson$(\lambda_{i,j,k} * a_{i,k} * p_{i,j,k})$. If a stem count $y_{i,j,k}=1$ at a microplot is considered, there are three ways to get a larger expected count, as follows: increase expected density $\lambda_{i,j,k}$; increase the area sampled $a_{i,k}$; and/or increase the probability that a stem is less than 5 in DBH $p_{i,j,k}=1$. With respect to probability $p_{i,j,k}$, and given a cumulative distribution function $F(x)$, the probability of it being less than 5 can be computed from the stem size distribution and corresponds to $F(5)$. This corresponds to coupling of the stem diameter model and the stem count model, to account for the counts only representing part of the stem size distribution, as represented mathematically in the observation model.

With respect to a stem size sub-model, an ecological model may be used to model the true underlying diameter at breast height distribution, such as by using a Weibull distribution as an approximation. This provides benefits, including that the distribution is fully specified by two parameters (shape and scale) and that it is widely used for DBH distribution modeling, but also is unimodal (which could be inconsistent with the true distribution in some places) and can be heavy tailed (which might not fully correspond to some species). Diameter distribution is assumed to vary among plots and among species. For any particular plot i and species j, the DBH distribution can be characterized with two parameters, as follows: shape parameter $\alpha_{i,j}$, and scale parameter $\sigma_{i,j}$. Given these two parameters, the probability that a stem is less than 5 inches DBH may be computed as follows: $p_{i,j,k=1}=F(5|\alpha_{i,j}, \sigma_{i,j})$. Similarly, if subplots count every stem over 5 in DBH, the probability that a stem is over 5 in DBH can be computed using the complementary cumulative distribution function as follows: $p_{i,j,k=2}=1-F(5|\alpha_{i,j}, \sigma_{i,j})$. Alternatively, if both subplots and macroplots are used and subplots count every stem from 5 in to 24 in DBH, the difference in cumulative distribution functions may be used to compute the probability that a stem is between 5 and 24 in DBH as $p_{i,j,k=2}=F(24|\alpha_{i,j}, \sigma_{i,j})-F(5|\alpha_{i,j}, \sigma_{i,j})$, and for macroplots as $p_{i,j,k=3}=1-F(24|\alpha_{i,j}, \sigma_{i,j})$. An observation model of the stem size sub-model accounts for the fact that FIA diameter observations are truncated based on plot type. For example, in microplots where DBH is only measured if it is less than 5, a probability density function $f(x)$ can be derived by considering a part of the Weibull distribution below 5, and renormalizing by $F(5)$ to ensure a valid probability distribution that integrates to one as follows: $f_{x \leq 5}(x)=f(x)/F(5)$. Similarly, an observation model can be constructed for stems in subplots when there are no macroplots via similar normalization, as follows: $f_{x>5}(x)=f(x)/(1-F(5))$. If both upper and lower bounds exist (e.g., subplot diameter data include values from 5 to 24), an observation model can similarly be constructed as follows: $f_{x \leq 5 \leq 24}(x)=f(x)/(F(24)-F(5))$. For binned, or interval-censored, DBH data, the probability of falling into each bin can also be modeled using the CDF, with the discrete distribution represented as a multinomial, where the sample size is the number of stems and the cell probabilities are computed using the CDF of the underlying DBH distribution. This has equivalent representations as a hierarchical Poisson-multinomial and a conditionally independent Poisson model. In addition, to avoid overfitting while including many potential features that could explain variation in forest cover/composition across space and time, it may be beneficial to include many predictors but assume that only a few will be relevant. In addition, known information about large trees can be used in the model(s) as prior probabilities on the upper end of stem size distributions, such as a soft constraint on Weibull DBH distribution upper tail quantiles.

In addition, while not illustrated in FIGS. 2I-2K, various types of additional information may be generated and used, such as by an example embodiment of a FIUM system, including information about wildlife habitat suitability, risk of harvest, carbon sequestration amounts, total merchantable value, etc., and as discussed in greater detail elsewhere herein. In addition, while various details have been provided with respect to FIGS. 2A-2K, it will be appreciated that the provided details are non-exclusive examples included for illustrative purposes, and other embodiments may be performed in other manners without some or all such details.

Figure 3:
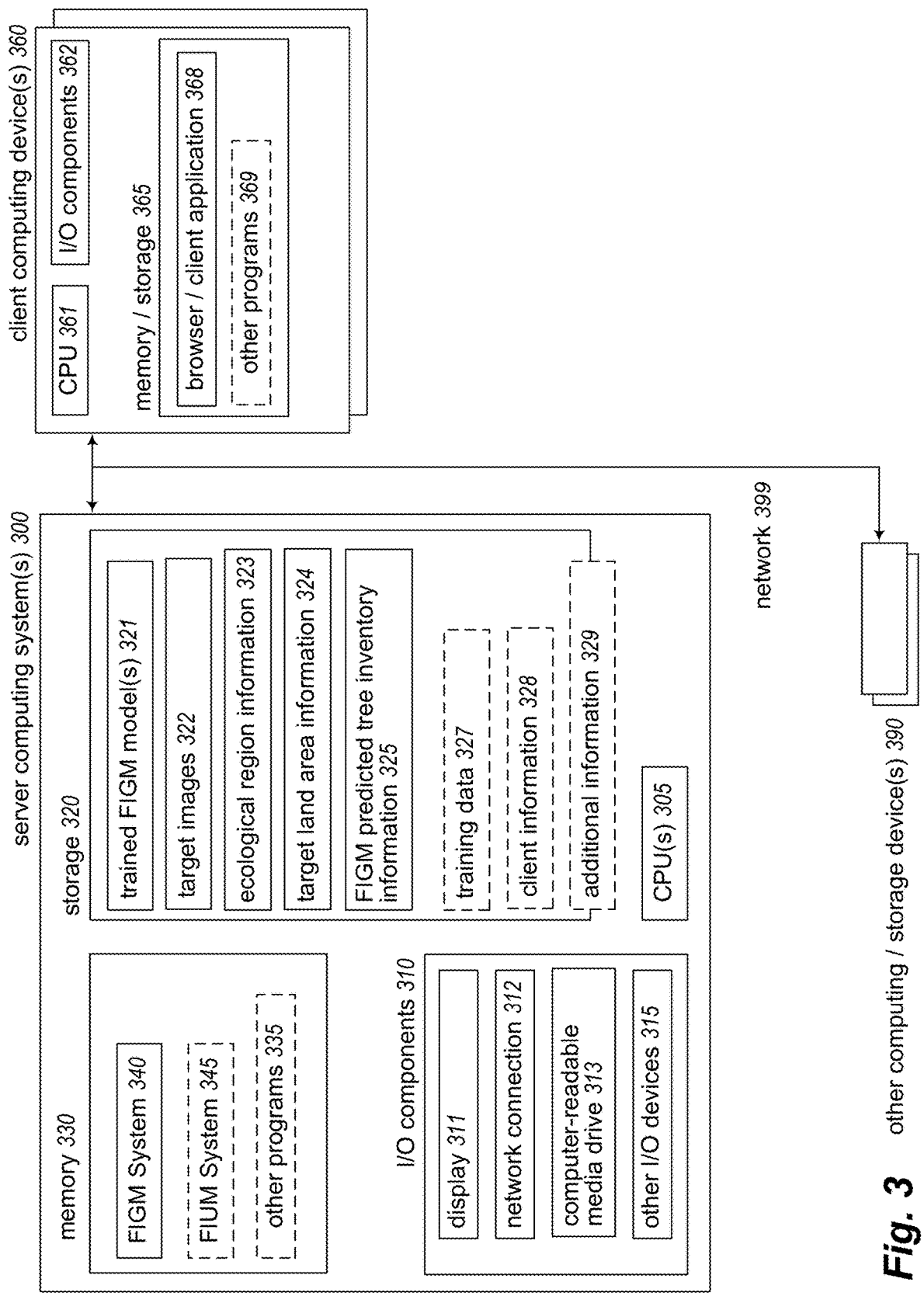
FIG. 3 is a block diagram illustrating computing systems suitable for executing embodiments of one or more systems that perform at least some of the techniques described in the present disclosure.

FIG. 3 is a block diagram illustrating an embodiment of one or more server computing systems 300 executing an implementation of an FIGM system 340 (e.g., analogous to FIGM system 140 executing on computing systems 180 of FIG. 1), and optionally an implementation of an FIUM system 345—the server computing system(s) and FIGM system (and optionally FIUM system) may be implemented using a plurality of hardware components that form electronic circuits suitable for and configured to, when in combined operation, perform at least some of the techniques described herein. In the illustrated embodiment, each server computing system 300 includes one or more hardware central processing units ("CPU") or other hardware processors 305, various input/output ("I/O") components 310, storage 320, and memory 330, with the illustrated I/O components including a display 311, a network connection 312, a computer-readable media drive 313, and other I/O devices 315 (e.g., keyboards, mice or other pointing devices, microphones, speakers, GPS receivers, etc.). Additional client computing devices 360 and other computing and/or storage devices 390 may similarly each include hardware components similar to those of a server computing system 300, such as with each client computing device having one or more hardware CPU processors 361 and various I/O components 362 and memory and/or storage 365, but with some of the details of server 300 being omitted in device 360 for the sake of brevity, and with corresponding details not shown for the other computing and/or storage devices 390. The server computing system(s) 300 and executing FIGM system 340 may also communicate with other computing systems and devices via one or more networks 399 (e.g., the Internet, one or more cellular telephone networks, etc.), such as client computing devices 360 used by users (not shown), other computing and/or storage devices 390 (e.g., used to view predicted tree inventory information determined by the FIGM system and/or outputs of the FIUM system and/or other related information), etc.

In the illustrated embodiment, an embodiment of the FIGM system 340 executes in memory 330 in order to perform at least some of the described techniques, such as by using the processor(s) 305 to execute software instructions of the system 340 in a manner that configures the processor(s) 305 and computing system(s) 300 to perform automated operations that implement those described techniques. The illustrated embodiment of the FIGM system may include one or more components, not shown, to each perform portions of the functionality of the FIGM system, and the memory may further optionally execute an embodiment 345 of the FIUM system and/or one or more other programs 335—as one example, one of the other programs 335 may include an executing copy of a system for accessing tree inventory information predicted by the FIGM system. The FIGM system 340 may further, during its operation, store and/or retrieve various types of data on storage 320 (e.g., in one or more databases or other data structures), such as one or more trained FIGM prediction models 321, information 323 about ecological regions, information 322 about overhead images of target land areas, information 324 about one or more target land areas (e.g., boundaries, climate data, ecological regions to which the land areas belong, etc.), determined tree inventory information 325 predicted by the FIGM system based at least in part on analysis of the visual data of one or more overhead images, and optionally additional information of one or more types (e.g., training data 327; information 328 about clients of the FIGM system, such as that request predicted tree inventory information from the FIGM system and/or that obtain predicted tree inventory information from the FIGM system; user information about users of client computing devices 360, various other types of additional information 329, etc.). The FIUM system 345, if executing, may similarly store and/or retrieve various types of data on storage 320 during its operation, including to retrieve and use predicted tree inventory information 325 (whether in a push and/or pull manner), and may provide results of its operation to client computing devices 360 and/or other computing/storage devices 390.

It will also be appreciated that computing systems and devices 300, 360 and 390 included within FIG. 3 are merely illustrative and are not intended to limit the scope of the present invention. The systems and/or devices may instead each include multiple interacting computing systems or devices, and may be connected to other devices that are not specifically illustrated, including via Bluetooth communication or other direct communication, through one or more networks such as the Internet, via the Web, or via one or more private networks (e.g., mobile communication networks, etc.). More generally, a device or other computing system may comprise any combination of hardware that may interact and perform the described types of functionality, optionally when programmed or otherwise configured with particular software instructions and/or data structures, including without limitation desktop or other computers (e.g., tablets, slates, etc.), database servers, network storage devices and other network devices, smart phones and other cell phones, consumer electronics, wearable devices, digital music player devices, handheld gaming devices, PDAs, wireless phones, Internet appliances, camera devices and accessories, and various other consumer products that include appropriate communication capabilities. In addition, the functionality provided by the illustrated FIGM system 340 may in some embodiments be distributed in various components, some of the described functionality of the FIGM system 340 may not be provided, and/or other additional functionality may be provided.

It will also be appreciated that, while various items are illustrated as being stored in memory or on storage while being used, these items or portions of them may be transferred between memory and other storage devices for purposes of memory management and data integrity. Alternatively, in other embodiments some or all of the software components and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the FIGM system 340 executing on server computing systems 300) and/or data structures, such as by execution of software instructions of the one or more software programs and/or by storage of such software instructions and/or data structures, and such as to perform algorithms as described in the flow charts and other disclosure herein. Furthermore, in some embodiments, some or all of the systems and/or components may be implemented or provided in other manners, such as by consisting of one or more means that are implemented partially or fully in firmware and/or hardware (e.g., rather than as a means implemented in whole or in part by software instructions that configure a particular CPU or other processor), including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the components, systems and data structures may also be stored (e.g., as software instructions or structured data) on a non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, components and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

FIG. 4 illustrates an example embodiment of a flow diagram for a Forest Inventory Generation Manager (FIGM) System routine 400. The routine may be performed by, for example, execution of the FIGM system 140 of FIG. 1, the FIGM system 340 of FIG. 3, the FIGM system discussed with respect to FIGS. 2A-2K, and/or an FIGM system as described elsewhere herein, such as to perform automated operations for determining tree inventory information for an area of land based at least in part on analyzing visual data of overhead image(s) of that land area. In the example of FIG. 4, particular types of information are analyzed in particular manners to determine particular types of predicted tree inventory information, but in other embodiments the routine may operate in other manners, including as discussed elsewhere herein.

The illustrated embodiment of the routine begins at block 405, where information or instructions are received. The routine continues to block 410 to determine whether the instructions or other information received in block 405 are to generate tree inventory information predictions for a target land area (e.g., for a forest on the target land area), and if so proceeds to perform blocks 415-435. In particular, the routine in block 415 obtains one or more overhead images of the target land area (e.g., a satellite image with spectral imaging data), an indication of an ecological region type for the land area (e.g., a particular level III ecological region), one or more trained tree inventory prediction models for that ecological region type, and optionally other information about the target land area (e.g., climate data, land data, etc.). In block 420, the routine then determines, for each pixel of the target image(a) corresponding to the target land area (optionally after excluding non-forest pixels), one or more reflectance values (e.g., corresponding to the spectral imaging data for the pixel). In block 425, the routine then generates, for each of those pixels, multiple separate predictions of tree inventory information for a subset of the target land area that the pixel represents, such as by sampling from one or more probability distributions of the one or more prediction models by using Markov Chain Monte Carlo simulation and Bayesian inference, and such as with each prediction having probabilistic inferences of species types and per-species tree quantities and sizes and optionally additional types of information. In block 430, the routine then combines the per-pixel tree inventory predictions to produce overall tree inventory predictions for each pixel, and to then combine the overall tree inventory predictions for each pixel to generate overall tree inventory predictions for the target land area, optionally along with associated uncertainty and/or confidence values (e.g., based on information from the multiple separate predictions). In block 435, the routine then optionally obtains feedback regarding accuracy of the generated tree inventory predictions for the land area (e.g., actual tree inventory information values from ground-based measurements or other data), such as immediately or at a later time, for optional later use in training (e.g., updating) the trained prediction models.

If it is instead determined in block 410 that the instructions or other information received in block 405 are not to generate tree inventory predictions for a target land area, the routine continues to block 450 where it determines if the instructions or other information received in block 405 are to train one or more tree inventory prediction models (e.g., by generating one or more such models as part of the training, by updating one or more existing such models, etc.), and if so continues to block 485 where it obtains training data and uses it to generate or update one or more corresponding trained tree inventory prediction models—such trading data may include, for example, pixel reflectance values for a type of ecological region with corresponding actual values for other types of tree inventory information to later be predicted, including to optionally use information obtained in block 435. After blocks 435 or 485, the routine continues to block 488 to store information determined and generated in blocks 415-485, and to optionally display or otherwise provide information to one or more requesters (e.g., to provide predicted tree inventory information from block 430 to an entity who supplied the request received in block 405 or to an executing embodiment of the FIUM system, etc.).

If it is instead determined in block 450 that the instructions or other information received in block 405 are not to train one or more tree inventory prediction models, the routine continues instead to block 490 to perform one or more other indicated operations as appropriate. Such other operations may include, for example, receiving and responding to requests for previously determined tree inventory information (e.g., requests for such information for display on one or more client devices, etc.), obtaining and storing information about land areas and/or trees for use in later operations (e.g., information for later use in blocks 415 and/or 435 and/or 485, etc.), obtaining and storing information about users and other client entities of the FIGM system (e.g., for use in later responding to requests from such clients), etc.

After blocks 488 or 490, the routine continues to block 495 to determine whether to continue, such as until an explicit indication to terminate is received, or instead only if an explicit indication to continue is received. If it is determined to continue, the routine returns to block 405 to wait for and receive additional instructions or information, and otherwise continues to block 499 and ends.

While not illustrated with respect to the automated operations shown in the example embodiment of FIG. 4, in some embodiments human users may further assist in facilitating some of the operations of the FIGM system, such as for operator users and/or end users of the FIGM system to provide input of one or more types that is further used in subsequent automated operations.

FIG. 5 illustrates an example embodiment of a flow diagram for a Forest Inventory Usage Manager (FIUM) System routine 500. The routine may be performed by, for example, execution of the FIUM system 345 of FIG. 3 and/or an FIUM system as described elsewhere herein, such as to perform automated operations for using the tree inventory information for one or more areas of land in one or more manners (e.g., to improve management of trees in some or all of those land areas). In the example of FIG. 5, particular types of information are used in particular manners, but in other embodiments the routine may operate in other manners, including as discussed elsewhere herein.

The illustrated embodiment of the routine begins at block 505, where information or instructions are received. The routine continues to block 510 to determine whether the instructions or other information received in block 505 are to manage one or more indicated land areas based at least in part on determined tree inventory information for the land area(a) that is predicted by an embodiment of the FIGM system. If so, the routine proceeds to block 515, where it obtains predicted tree inventory information for the land area(a), and initiates one or more further management activities for some or all of the land area(s), such as to take actions to modify trees on the land area(a) and/or other characteristics of the land area(s).

If it is instead determined in block 510 that the instructions or other information received in block 505 are not to manage one or more indicated land areas, the routine continues instead to block 530 where it determines if the instructions or other information received in block 505 are to generate further information of one or more types based on determined tree inventory information for the land area (a) that is predicted by an embodiment of the FIGM system. If so, the routine proceeds to block 585, where it obtains predicted tree inventory information for the land area(a), and analyzes that predicted information to generate one or more further types of information for some or all of the land area(s), such as one or more of the following: information about stem density; forest type; basal area; sequester carbon; other vegetation; total biomass; trees quadratic mean diameter; total volume of some or all of the trees; related information for one or more other land areas, such as adjacent land areas and/or a larger ecological region; etc.

After blocks 515 or 585, the routine continues to block 588 to store information determined and generated in blocks 515-585, and to optionally display or otherwise provide information to one or more requesters (e.g., to provide information from blocks 515 or 585 to an entity who supplied the request received in block 505, etc.).

If it is instead determined in block 530 that the instructions or other information received in block 505 are not to generate further information of one or more types, the routine continues instead to block 590 to perform one or more other indicated operations as appropriate. Such other operations may include, for example, receiving and responding to requests for previously generated information (e.g., requests for such information for display on one or more client devices, etc.), obtaining and storing information about land areas and/or trees for use in later operations (e.g., information for later use in blocks 515 and/or 585, etc.), obtaining and storing information about users and other client entities of the FIUM system (e.g., for use in later responding to requests from such clients), etc.

After blocks 588 or 590, the routine continues to block 595 to determine whether to continue, such as until an explicit indication to terminate is received, or instead only if an explicit indication to continue is received. If it is determined to continue, the routine returns to block 505 to wait for and receive additional instructions or information, and otherwise continues to block 599 and ends.

While not illustrated with respect to the automated operations shown in the example embodiment of FIG. 5, in some embodiments human users may further assist in facilitating some of the operations of the FIUM system, such as for operator users and/or end users of the FIUM system to provide input of one or more types that is further used in subsequent automated operations.

Aspects of the present disclosure are described herein with reference to flowchart illustrations and/or block diagrams of methods, apparatus (systems), and computer program products according to embodiments of the present disclosure. It will be appreciated that each block of the flowchart illustrations and/or block diagrams, and combinations of blocks in the flowchart illustrations and/or block diagrams, can be implemented by computer readable program instructions. It will be further appreciated that in some implementations the functionality provided by the routines discussed above may be provided in alternative ways, such as being split among more routines or consolidated into fewer routines, and that illustrated routines may in some implementations provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, or synchronous or asynchronous) and/or in a particular order, in other implementations the operations may be performed in other orders and in other manners. Any data structures discussed above may also be structured in different manners, such as by having a single data structure split into multiple data structures and/or by having multiple data structures consolidated into a single data structure. Similarly, in some implementations illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by corresponding claims and the elements recited by those claims. In addition, while certain aspects of the invention may be presented in certain claim forms at certain times, the inventors contemplate the various aspects of the invention in any available claim form. For example, while only some aspects of the invention may be recited as being embodied in a computer-readable medium at particular times, other aspects may likewise be so embodied.

What is claimed is:

1. A computer-implemented method comprising:
    training, by one or more computing systems, one or more statistical models using data about trees located in areas that are covered by satellite images and that are part of an indicated type of ecological region, including data about species and quantities and sizes of the trees located in the areas of the indicated type of ecological region;
    generating, by the one or more computing systems and using at least one statistical model of the one or more statistical models, information about trees for an indicated area of land that is of the indicated type of ecological region and is distinct from the areas used for the training, wherein the information is generated without identifying individual trees on the indicated area of land and includes one or more predictions of one or more species of trees on the indicated area of land and of a quantity of trees of each of the one or more species of trees on the indicated area of land and of a size of the trees of each of the one or more species of trees on the indicated area of land, including:
        receiving, by the one or computing systems, information about the indicated area of land that includes a target satellite image with spectral imaging data for the indicated area of land;
        determining, by the one or more computing systems and for each pixel of the target satellite image that has data about a subset of the indicated area of land, a plurality of estimates for that subset of the indicated area of land for that pixel based at least in part on analysis of one or more reflectance values for the spectral imaging data for that pixel and on the indicated type of ecological region, wherein each estimate of the plurality is based on a separate simulation using the at least one statistical model and includes probabilistic enumerations for that estimate of, for that subset of the indicated area of land for that pixel, which species of trees are on that subset and of how many of each of the one or more species of trees are on that subset and of tree sizes for each of the one or more species of trees on that subset; and
        combining, by the one or more computing systems, the probabilistic enumerations from the plurality of estimates to produce, for the indicated area of land, the one or more predictions of the one or more species of trees and of the quantity of each of the one or more species of trees and the size of the trees for each of the one or more species of trees, and one or more uncertainty values corresponding to confidence in the one or more predictions; and
    managing, based at least in part on the prediction for the indicated area of land of the one or more species of trees and of the quantity of each of the one or more species of trees and of the size of each of the one or more species of trees, further activities on the indicated area of land involving the trees for the indicated area of land.

2. The computer-implemented method of claim 1 wherein the training of the one or more statistical models includes training multiple statistical models that are each specific to one of multiple types of ecological regions, and wherein the generating of the information about the trees for the indicated area of land includes:

selecting, as the at least one statistical model, one of the multiple statistical models that is trained for the indicated type of ecological region;

using, as part of the determining of the plurality of estimates, information about the indicated area of land that includes climate data and data about at least one land cover classification; and generating the plurality of estimates by using Markov Chain Monte Carlo simulations to sample from at least one probability distribution space associated with the at least one statistical model, and by using Bayesian inference to determine the probabilistic enumerations.

3. A computer-implemented method comprising:

obtaining, by one or more computing systems, multiple statistical models that are each associated with a defined level III or level IV ecological region and trained to predict information about trees that are present in areas of that defined level III or level IV ecological region by using overhead images of those areas;

generating, by the one or more computing systems, and for an indicated area of land, information that includes one or more predictions of one or more species of trees on the indicated area of land and of a quantity of trees of each of the one or more species of trees on the indicated area of land, including:

receiving, by the one or computing systems, information about the indicated area of land that includes an overhead image with a plurality of pixels having visual data including the indicated area of land, and that indicates a type of ecological region in which the indicated area of land is located, wherein the indicated type of ecological region is a level III or level IV ecological region;

selecting, by the one or computing systems, one of the multiple statistical models that is associated with the indicated type of ecological region;

determining, by the one or more computing systems, a plurality of estimates for the indicated area of land based at least in part on the indicated type of ecological region, including, for each of multiple pixels of the plurality of pixels, performing a simulation using a reflectance value of that pixel and the selected one statistical model to generate one or more estimates of the plurality of estimates having enumerations of which species of trees are on a subset of the indicated area of land visible in that pixel and of how many of each of the one or more species of trees are on that subset of the indicated area of land; and combining, by the one or more computing systems, the enumerations from the plurality of estimates to produce, for the indicated area of land, the one or more predictions of the one or more species of trees and of the quantity of trees of each of the one or more species of trees; and providing, by the one or more computing systems, the generated information for the indicated area of land, to enable further management of the indicated area of land based at least in part on the one or more predictions for the indicated area of land of the one or more species of trees and of the quantity of trees of each of the one or more species of trees.

4. The computer-implemented method of claim 3 wherein the determining of the plurality of estimates for the indicated area of land by the one or more computing systems includes using Bayesian inference to generate probabilistic values for the enumerations of each of the plurality of estimates, and wherein the one or more predictions for the indicated area of land of the one or more species of trees and of the quantity of trees of each of the one or more species of trees include probabilistic values.

5. The computer-implemented method of claim 4 wherein the determining of the plurality of estimates for the indicated area of land by the one or more computing systems further includes generating uncertainty information for the one or more predictions for the indicated area of land of the one or more species of trees and of the quantity of trees of each of the one or more species of trees based at least in part on using information from at least some of the plurality of estimates, and wherein the one or more predictions for the indicated area of land of the one or more species of trees and of the quantity of trees of each of the one or more species of trees include the generated uncertainty information.

6. The computer-implemented method of claim 3 wherein the determining of the plurality of estimates for the indicated area of land by the one or more computing systems includes using Markov Chain Monte Carlo simulation to, for each of the plurality of estimates, generate the enumerations for that estimate by sampling from at least one probability distribution space associated with the at least one statistical model.

7. The computer-implemented method of claim 3 wherein the determining of the plurality of estimates for the indicated area of land by the one or more computing systems further includes, for each of the multiple pixels:

determining one or more reflectance values for the pixel;

generating, based at least in part on the determined one or more reflectance values, multiple estimates of the plurality of estimates that are for the pixel's respective subset of the indicated area of land and that each includes a prediction of at least one species of trees present on that respective subset of the indicated area of land and a predicted quantity of trees of each of the at least one species of trees on that respective subset of the indicated area of land; and combining information from the multiple estimates for the pixel to determine, for that respective subset of the indicated area of land, a subset of the one or more predictions of the one or more species of trees and of the quantity of trees of each of the one or more species of trees, and wherein the combining of the enumerations from the plurality of estimates includes aggregating the combined information for each of the multiple pixels to produce the one or more predictions for the indicated area of land of the one or more species of trees and of the quantity of trees of each of the one or more species of trees.

8. The computer-implemented method of claim 7 wherein the determining of the plurality of estimates for the indicated area of land by the one or more computing systems further includes obtaining and using additional data for the indicated area of land that includes at least one of climate data for the indicated area of land or land cover classification data for the indicated area of land.

9. The computer-implemented method of claim 8 wherein the additional data for the indicated area of land includes the climate data for the indicated area of land and the land cover classification data for the indicated area of land and at least one of lidar data or radar data or topography data or soil data or chemical data or pollen data or images captured at a level below tops of trees on the indicated area of land or ground-based measurements of trees for a portion of the indicated area of land or one or more previously generated estimates for trees on the indicated area of land for one or more earlier times, and wherein the climate data includes multiple of temperature data or precipitation data or solar radiation data or wind speed data or water vapor pressure data.

10. The computer-implemented method of claim 3 wherein the generating of the information for the indicated area of land further includes generating one or more predictions for the trees of the one or more species that includes at least one of predicted height or predicted diameter or predicted volume or predicted basal area or predicted biomass or predicted quadratic mean diameter information or predicted stem density.

11. The computer-implemented method of claim 3 wherein the generating of the information for the indicated area of land further includes generating one or more predictions for the indicated area of land of at least one of a type of forest or species habitat or fire load or fire risk or soil conditions or types of vegetation other than trees or locations within the indicated area of land of particular trees.

12. The computer-implemented method of claim 3 wherein the generating of the information for the indicated area of land further includes generating one or more predictions of at least one of a carbon sequestration amount or a total merchantable volume or a timber value.

13. The computer-implemented method of claim 3 further comprising training, by the one or more computing systems and before the generating of the information for the indicated area of land, the multiple statistical models.

14. The computer-implemented method of claim 13 wherein the training of the at least statistical model includes using one or more representations of how training data about trees is collected, and wherein the generating of the information for the indicated area of land further includes using at least one of the one or more representations for the indicated area of land.

15. The computer-implemented method of claim 3 wherein the generating of the information for the indicated area of land is performed in response to a request from an entity associated with the indicated area of land and without identifying individual trees on the indicated area of land, and wherein the providing of the generated information for the indicated area of land includes transmitting, by the one or more computing systems and over at least one computer network to at least one client computing device of the entity, the generated information for the indicated area of land.

16. The computer-implemented method of claim 3 wherein the overhead image lacks visual data for a subset of the indicated area of land, and wherein the generating of the information for the indicated area of land further includes determining predictions of tree species and tree quantities for the subset of the indicated area of land based on at least one of interpolation or extrapolation for one or more other subsets of the indicated area of land that have corresponding visual data in the overhead image.

17. A non-transitory computer-readable medium having stored contents that cause one or more computing systems to perform automated operations including at least:
  generating, by the one or more computing systems and using at least one model trained to predict information about trees based at least in part on one or more types of ecological regions, information for an indicated area of land that includes one or more predictions that quantify trees on the indicated area of land, including:
    receiving, by the one or computing systems, information about the indicated area of land that includes visual data collected for the indicated area of land from at least one overhead location, and an indicated type of ecological region for the indicated area of land;
    determining, by the one or more computing systems, a plurality of estimates for the indicated area of land based at least in part on the indicated type of ecological region and on analysis of the visual data, including, for each of multiple pixels of the visual data, performing a simulation using a reflectance value of that pixel and the at least one statistical model to generate one or more estimates of the plurality each having one or more quantifications of the trees on a subset of the indicated area of land corresponding to that pixel; and
    combining, by the one or more computing systems, the quantifications from the plurality of estimates to produce the one or more predictions that quantify the trees on the indicated area of land; and
  providing, by the one or more computing systems, the generated information for the indicated area of land.

18. The non-transitory computer-readable medium of claim 17 wherein the target data collected for the indicated area of land includes at least one overhead image, wherein the at least one model is a statistical model trained for the indicated type of ecological region and is selected from a plurality of trained statistical models, and wherein the determining of the plurality of estimates for the indicated area of land includes, for each of the multiple pixels, generating enumerations of which species of trees are on the subset of the indicated area of land corresponding to that pixel and of how many of each of the one or more species of trees are on the subset of the indicated area of land corresponding to that pixel.

19. The non-transitory computer-readable medium of claim 17 wherein the data collected for the indicated area of land includes at least one of radar data, or lidar data, or chemical data, and wherein the determining of the plurality of estimates for the indicated area of land is based on the at least one of the radar data or the lidar data or the chemical data.

20. The non-transitory computer-readable medium of claim 19 wherein the data collected for the indicated area of land includes at least one of radar data or lidar data, wherein the received information about the indicated area of land further includes prior tree inventory information for at least some of the indicated area of land from one or more earlier times, and wherein the determining of the plurality of estimates for the indicated area of land is based on the at least one of the radar data or the lidar data and is based on the prior tree inventory information.

21. A system comprising:
  one or more hardware processors of one or more computing systems; and
  one or more memories with stored instructions that, when executed by at least one of the one or more hardware processors, cause the one or more computing systems to perform automated operations including at least:
    generating information for an indicated area of land that includes one or more predictions of quantities and sizes of each of the one or more vegetation types on the indicated area of land, including:
      receiving information about the indicated area of land that includes an overhead image with a plurality of pixels having visual data including the indicated area of land, and an indicated type of ecological region in which the indicated area of land is located that is a level III or level IV ecological region;

selecting, from multiple models that are each associated with a defined level III or level IV ecological region and trained to predict information about one or more vegetation types that are present in areas of that defined level III or level IV ecological region, at least one model of the multiple models that is associated with the indicated type of ecological region;

determining a plurality of estimates for the indicated area of land based at least in part on the indicated type of ecological region, including, for each of multiple pixels of the plurality of pixels, generating one or more estimates of the plurality of estimates using a reflectance value of that pixel and the selected at least one model, wherein each of the one or more estimates includes enumerations for that estimate of the quantities and the sizes of each of the one or more vegetation types on a subset of the indicated area of land corresponding to that pixel; and combining the enumerations from the plurality of estimates to produce, for the indicated area of land, the one or more predictions of the quantities and the sizes of each of the one or more vegetation types on the indicated area of land; and providing the generated information for the indicated area of land.

22. The system of claim 21 wherein the at least one model is a statistical model, wherein the one or more vegetation types include one or more tree species, and wherein the determining of the plurality of estimates for the indicated area of land includes generating enumerations of which of the one or more tree species are present on the indicated area of land and of how many of each of the one or more tree species are on the indicated area of land.

* * * * *